US012588070B2

(12) United States Patent
Axnäs et al.

(10) Patent No.: US 12,588,070 B2
(45) Date of Patent: Mar. 24, 2026

(54) PHYSICAL RANDOM ACCESS CHANNEL (PRACH) CONFIGURATIONS FOR SUBCARRIER SPACING (SCS)

(71) Applicant: Telefonaktiebolaget LM Ericsson (publ), Stockholm (SE)

(72) Inventors: Johan Axnäs, Solna (SE); Stephen Grant, Pleasanton, CA (US); Peter Alriksson, Hörby (SE); Emma Wittenmark, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 320 days.

(21) Appl. No.: 18/261,613

(22) PCT Filed: Jan. 17, 2022

(86) PCT No.: PCT/SE2022/050047
§ 371 (c)(1),
(2) Date: Jul. 14, 2023

(87) PCT Pub. No.: WO2022/154744
PCT Pub. Date: Jul. 21, 2022

(65) Prior Publication Data
US 2024/0080900 A1     Mar. 7, 2024

Related U.S. Application Data

(60) Provisional application No. 63/138,190, filed on Jan. 15, 2021.

(51) Int. Cl.
*H04W 74/0833*     (2024.01)
*H04W 72/02*     (2009.01)

(52) U.S. Cl.
CPC ....... *H04W 74/0833* (2013.01); *H04W 72/02* (2013.01)

(58) Field of Classification Search
CPC ............ H04W 74/0833; H04W 72/02; H04W 72/0446; H04W 74/0866
See application file for complete search history.

(56) References Cited

U.S. PATENT DOCUMENTS

2022/0225416 A1* 7/2022 He .................... H04W 74/0833
2022/0408492 A1* 12/2022 Shin ........................ H04L 27/26
(Continued)

OTHER PUBLICATIONS

3GPP TSG RAN WG1 Meeting #103-e; R1-2009688; Source: Moderator (Intel Corporation); Title: [103-e-NR-52-71-Waveform-Changes] Discussions Summary #4; e-Meeting, Oct. 26-Nov. 13, 2020 (Year: 2020).*

(Continued)

*Primary Examiner* — Mohammed S Chowdhury
(74) *Attorney, Agent, or Firm* — Weisberg I.P. Law, P.A.

(57) ABSTRACT

A method, system and apparatus are disclosed. According to some embodiments, a wireless device is provided. The wireless device includes processing circuitry configured to and/or that operates to: select at least one slot from a plurality of slots that correspond to a first subcarrier spacing, SCS, greater than 120 kHz where each of the at least one slot includes at least physical random access channel, PRACH, occasion, and cause PRACH signaling based on the at least one slot.

14 Claims, 15 Drawing Sheets

(56)      References Cited

U.S. PATENT DOCUMENTS

| | | | |
|---|---|---|---|
| 2023/0171813 A1* | 6/2023 | Zheng | H04W 74/0841 |
| | | | 370/329 |
| 2023/0319897 A1* | 10/2023 | Li | H04W 74/004 |
| | | | 370/329 |

OTHER PUBLICATIONS

3GPP TS 38.211 V16.4.0 (Dec. 2020); (Year: 2020).*

International Search Report and Written Opinion dated May 3, 2022 for International Application No. PCT/SE2022/050047 filed Jan. 17, 2022, consisting of 10-pages.

3GPP TS 38.211 V15.4.0; 3rd Generation Partnership Project; Technical Specification Group Radio Access Network; NR; Physical channels and modulation (Release 15); Dec. 2018, consisting of 96-pages.

3GPP TSG RAN WG1 #103 R1-2007926; Title: Required changes to NR using existing DL/UL NR waveform; Agenda Item: 8.2.1; Source: Nokia, Nokia Shanghai Bell; Document for: Discussion and Decision; Date and Location: Oct. 26-Nov. 13, 2020, e-Meeting, consisting of 41-pages.

3GPP TSG RAN WG1 Meeting #103-e R1-2009379; Title: Discussion on Required changes to NR in 52.6-71GHz; Agenda Item: 8.2.1; Source: Intel Corporation; Document for: Discussion/Decision; Date and Location: Oct. 26-Nov. 13, 2020, e-Meeting, consisting of 38-pages.

3GPP TSG RAN WG1 Meeting #103-e R1-2009718; Title: [103-e-NR-52-71-Waveform-Changes] Discussions Summary #6; Agenda Item: 8.2.1; Source: Moderator (Intel Corporation); Document for: Discussion; Date and Location: October 26-Nov. 13, 2020, e-Meeting, consisting of 205-pages.

* cited by examiner

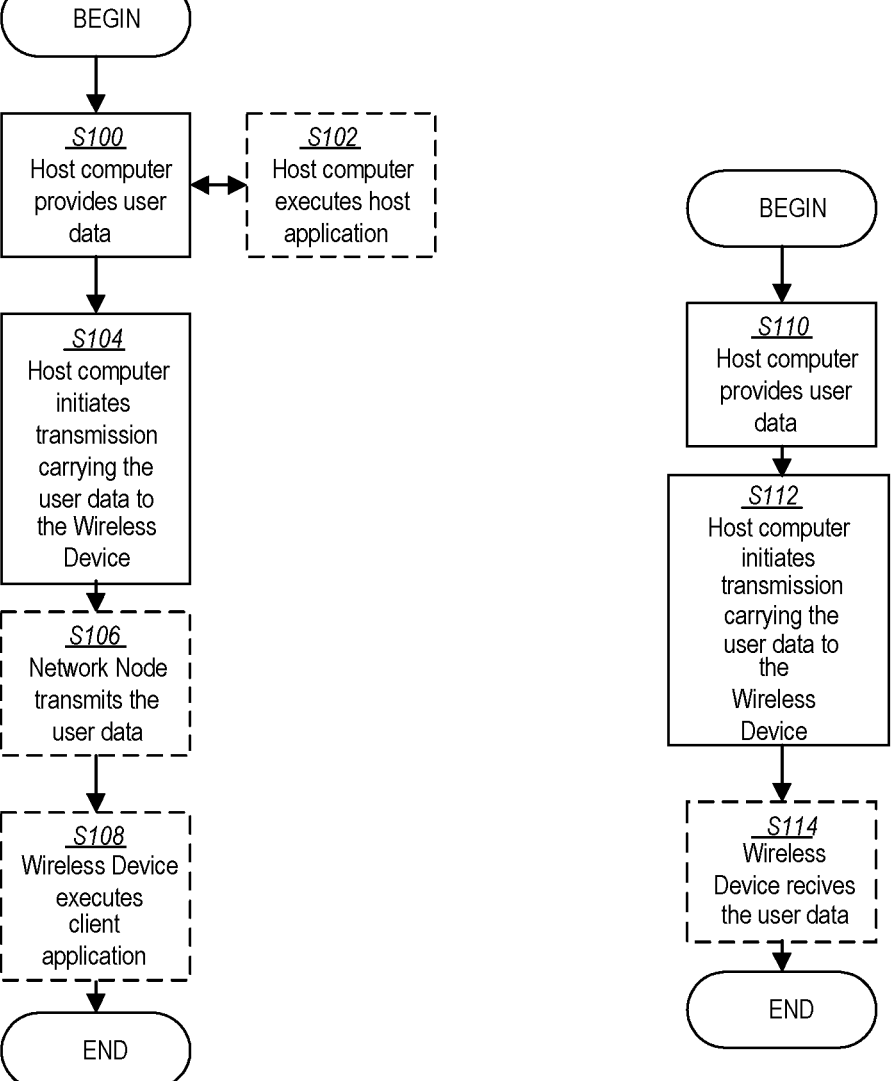
FIG. 9                                    FIG. 10

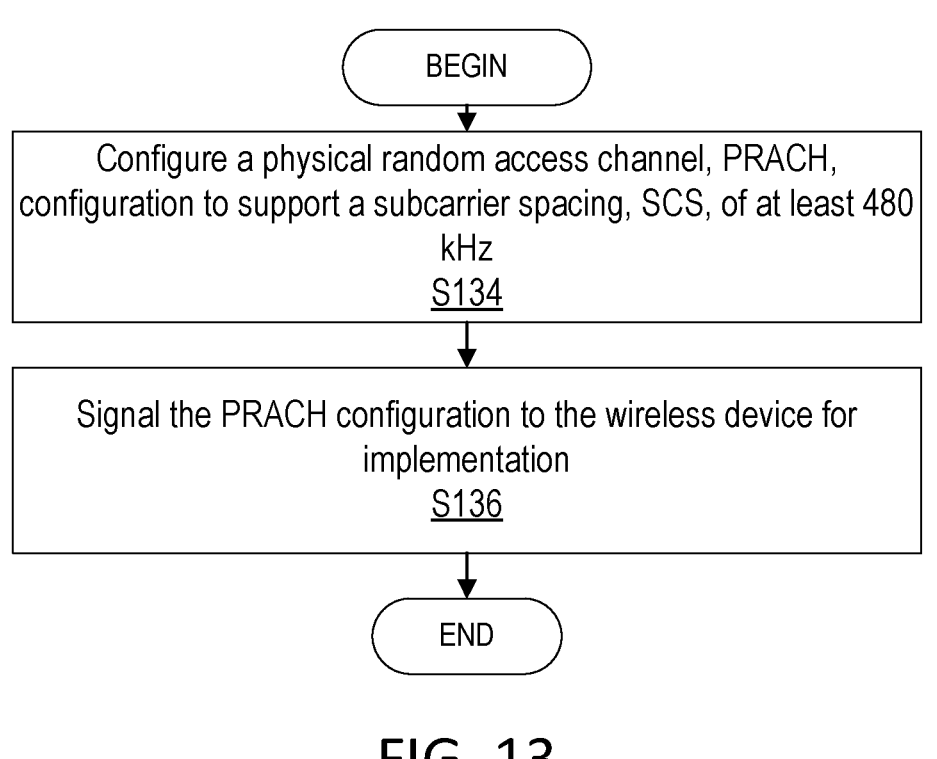
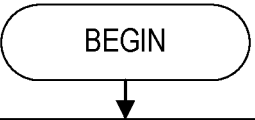
FIG. 13
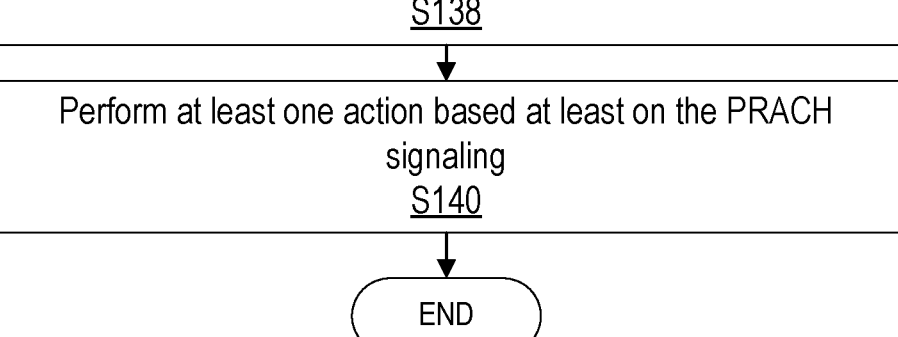
FIG. 14

FIG. 18

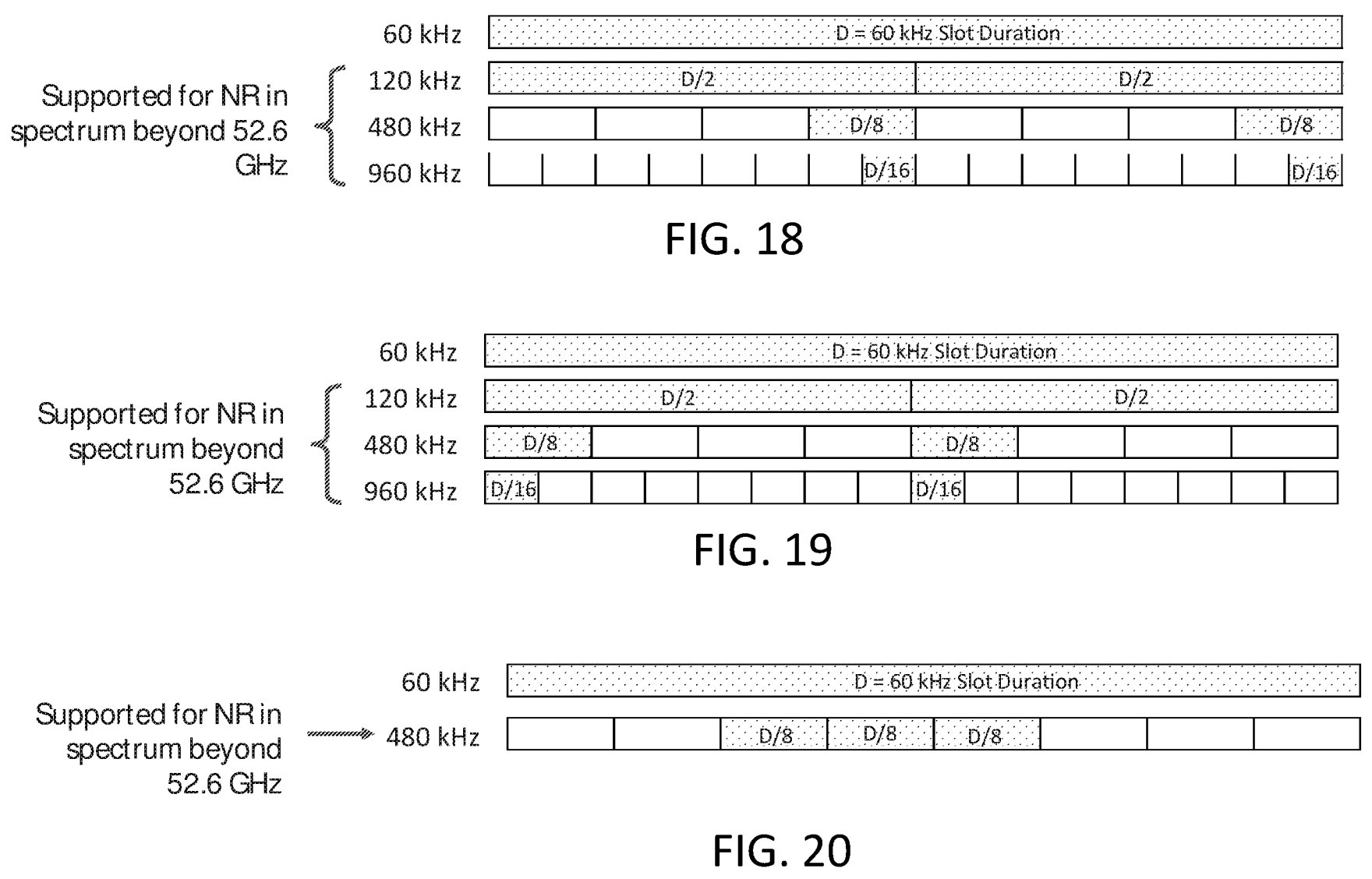

D = 60 kHz Slot Duration 60 kHz 120 kHz — D/2, D/2

480 kHz — D/8, D/8

960 kHz — D/16, D/16

Supported for NR in spectrum beyond 52.6 GHz

FIG. 19

D = 60 kHz Slot Duration 60 kHz 120 kHz — D/2, D/2

480 kHz — D/8, D/8

960 kHz — D/16, D/16

Supported for NR in spectrum beyond 52.6 GHz

FIG. 20

D = 60 kHz Slot Duration 60 kHz 480 kHz — D/8, D/8, D/8, D/8

Supported for NR in spectrum beyond 52.6 GHz

FIG. 21

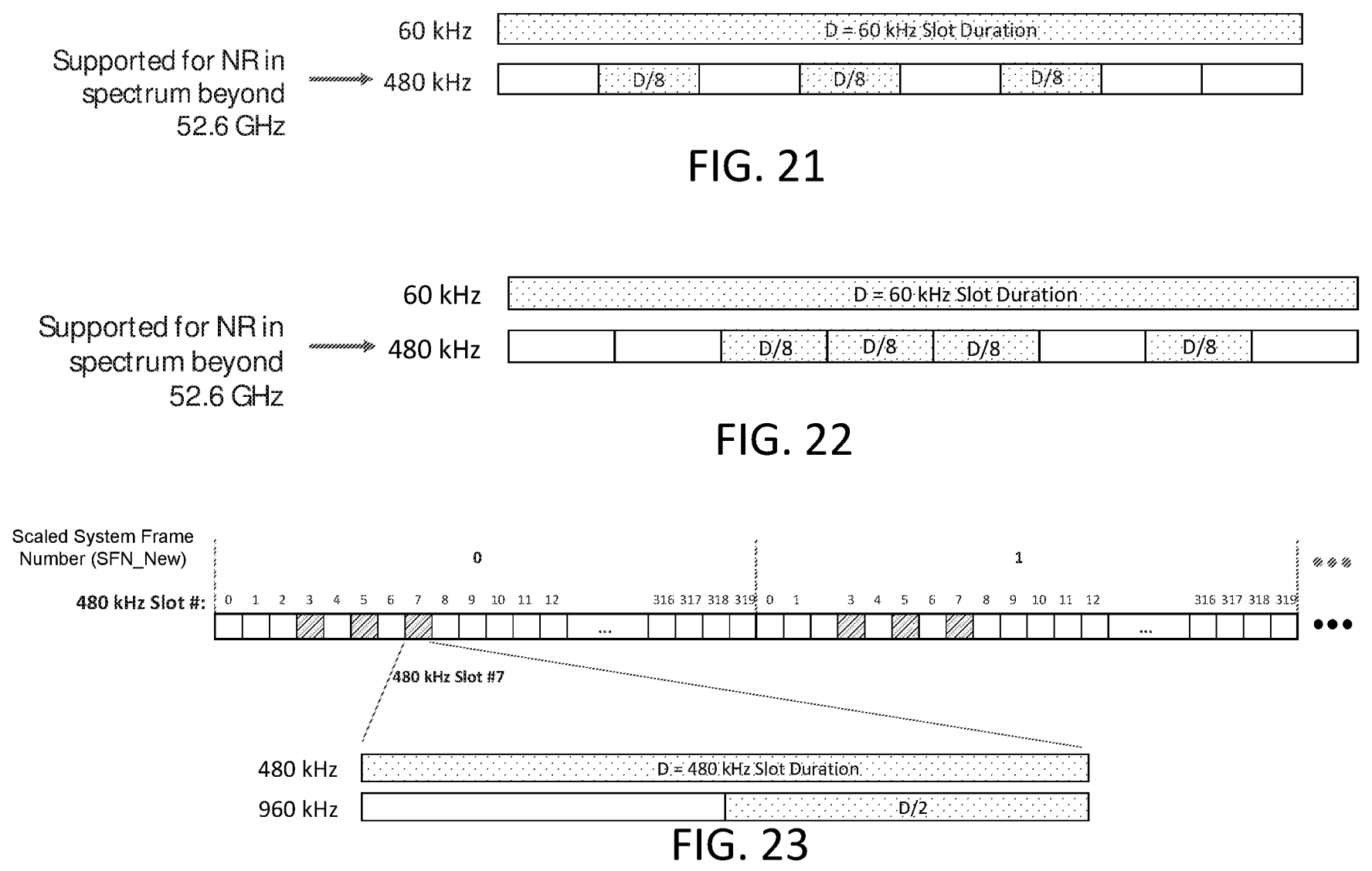

60 kHz 480 kHz

D = 60 kHz Slot Duration

D/8    D/8    D/8

Supported for NR in spectrum beyond 52.6 GHz

FIG. 22

60 kHz 480 kHz

D = 60 kHz Slot Duration

D/8    D/8    D/8    D/8

Supported for NR in spectrum beyond 52.6 GHz

FIG. 23

Scaled System Frame Number (SFN_New)

480 kHz Slot #:

480 kHz Slot #7

D = 480 kHz Slot Duration

D/2

480 kHz 960 kHz

PHYSICAL RANDOM ACCESS CHANNEL (PRACH) CONFIGURATIONS FOR SUBCARRIER SPACING (SCS)

CROSS-REFERENCE TO RELATED APPLICATIONS

This application is a Submission Under 35 U.S.C. § 371 for U.S. National Stage Patent Application of International Application No.: PCT/SE2022/050047, filed Jan. 17, 2022 entitled "PHYSICAL RANDOM ACCESS CHANNEL (PRACH) CONFIGURATIONS FOR SUBCARRIER SPACING (SCS)," which claims priority to U.S. Provisional Application No. 63/138,190, filed Jan. 15, 2021, entitled "METHOD FOR FACILITATING LARGE SUBCARRIER SPACING FOR PRACH CONFIGURATION," the entireties of both of which are incorporated herein by reference.

TECHNICAL FIELD

The present disclosure relates to wireless communications, and in particular, to Physical Random Access Channel (PRACH) configurations that support modified subcarrier spacing (SCS) such as increased SCS of 480 kHz and/or 900 kHz.

BACKGROUND

Mobile broadband continues to drive the demands for very large overall traffic capacity and achievable end-user data rates in the wireless access network. Several scenarios in the future may require data rates of up to 10 Gbps in local areas. These demands for very large system capacity and end-user date rates may be met by networks with distances between access nodes ranging from a few meters in indoor deployments up to roughly 50 m in outdoor deployments, i.e., with an infra-structure density considerably higher than the densest networks of today.

In Third Generation Partnership Project (3GPP) Release (Rel-15), a 5G system referred as New Radio (NR) was specified. The NR standard in 3GPP is designed to provide services for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Besides traditional licensed exclusive frequency bands, NR systems are currently being extended and may be expected to operate on unlicensed bands. The NR system specifications currently address two frequency ranges (FR1 and FR2), which are summarized in Table 1 below. To support ever growing mobile traffic, a work item within 3GPP is under way to extend the NR system to support spectrum higher than 5.26 GHz.

TABLE 1

| Frequency range designation | Corresponding frequency range |
|---|---|
| FR1 | 410 MHz-7125 MHz |
| FR2 | 24250 MHz-52600 MHz |

Overview of 3GPP Rd-15 NR System
Numerology and Bandwidth

The downlink transmission waveform in NR is conventional OFDM using a cyclic prefix. The uplink transmission waveform is conventional OFDM using a cyclic prefix with a transform precoding function performing DFT spreading that can be disabled or enabled. A transmitter block diagram for CP-OFDM with optional DFT-spreading for NR is illustrated in FIG. 1.

Multiple numerologies are supported in NR. A numerology is defined by sub-carrier spacing and CP overhead. Multiple subcarrier spacings (SCS) can be derived by scaling a basic subcarrier spacing by an integer $2^\mu$. The numerology used can be selected independently of the frequency band although it is assumed not to use a very small subcarrier spacing at very high carrier frequencies. Flexible network and wireless device channel bandwidths are supported. The supported transmission numerologies in NR are summarized in Table 2.

TABLE 2

| $\mu$ | $\Delta f = 2^\mu \cdot 15$ [kHz] | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

From a Radio Access Network 1 (RAN1) specification perspective, maximum channel bandwidth per NR carrier is 400 MHz in 3GPP Rel-15. At least for single numerology case, candidates of the maximum number of subcarriers per NR carrier is 3300 in 3GPP Rel-15 from RAN1 specification perspective.

Downlink and uplink transmissions are organized into frames with 10 ms duration, consisting of ten 1 ms subframes. Each frame is divided into two equally-sized half-frames of five subframes each. The slot such as a slot based on 15 kHz sub-carrier spacing (SCS) has a duration is 14 symbols with Normal CP and 12 symbols with Extended CP, and scales in time as a function of the used sub-carrier spacing so that there is always an integer number of slots in a subframe. More specifically, the number of slots per subframe is $2^\mu$. The symbols may be OFDM symbols having a duration of 66.67 us such as in the 15 kHz SCS example, described below.

The basic NR downlink physical resource within a slot can be seen as a time-frequency grid as illustrated in the example of FIG. 2. An NR downlink physical resource for 15 kHz sub-carrier spacing numerology for 15 kHz sub-carrier spacing numerology, where each resource element corresponds to one OFDM subcarrier during one OFDM symbol interval. A resource block is defined as 12 consecutive subcarriers in the frequency domain. The uplink subframe has the same subcarrier spacing as the downlink and the same number of SC-FDMA symbols in the time domain as OFDM symbols in the downlink.

Resource Blocks

In 3GPP Rel-15 NR, a wireless device can be configured with up to four carrier bandwidth parts in the downlink with a single downlink carrier bandwidth part being active at a given time. A wireless device can be configured with up to four carrier bandwidth parts in the uplink with a single uplink carrier bandwidth part being active at a given time. If a wireless device is configured with a supplementary uplink, the wireless device can in addition be configured with up to four carrier bandwidth parts in the supplementary uplink with a single supplementary uplink carrier bandwidth part being active at a given time.

For a carrier bandwidth part with a given numerology, a contiguous set of physical resource blocks (PRBs) are defined and numbered from 0 to $N_{BWP}^{size}$, −1, where i is the index of the carrier bandwidth part. A resource block (RB) is defined as 12 consecutive subcarriers in the frequency domain.

Physical Channels

A downlink physical channel corresponds to a set of resource elements carrying information originating from higher layers. The following example downlink physical channels are defined:

Physical Downlink Shared Channel, PDSCH

Physical Broadcast Channel, PBCH

Physical Downlink Control Channel, PDCCH:

PDSCH is a physical channel used for unicast downlink data transmission, but also for transmission of RAR (random access response), certain system information blocks, and paging information. PBCH carries the basic system information, required by the wireless device to access the network or network node. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following example uplink physical channels are defined:

Physical Uplink Shared Channel, PUSCH

Physical Uplink Control Channel, PUCCH

Physical Random Access Channel, PRACH

PUSCH is the uplink counterpart to the PDSCH. PUCCH is used by wireless devices to transmit uplink control information, including HARQ acknowledgments, channel state information reports, etc. PRACH is used for random access preamble transmission.

PRACH Formats in NR

The PRACH formats supported in NR 3GPP Rel-15 are illustrated in FIG. 3. In 3GPP Rel-15, PRACH sequence lengths L=139 and 839 are supported. In NR 3GPP Rel-16 for operation in unlicensed spectrum, longer sequences L=571 and 1151 were introduced. All formats consist of a Zadoff-Chu sequences that is repeated one or multiple times without cyclic prefix in between repetitions (only a cyclic prefix at the very beginning of the preamble). Note that the Bx formats have small guard periods at the end, and Cx formats somewhat larger guards.

Multiple PRACH preambles can generally be time-multiplexed in a single slot as illustrated in FIG. 4 where PRACH allocations within a slot are shown. Note that FIG. 4 only shows example allocations within a slot. The actual allocation (configuration) to use is determined by the PRACH configuration table is discussed below. PRACH occasions can also be multiplexed in frequency, but this will not be further discussed herein. Note that the term "PRACH occasion," in one or more embodiments may refer to what is referred to as "time-domain PRACH occasion" (i.e., one PRACH transmission time instance, which may then potentially contain several frequency-multiplexed PRACH occasions in the proper sense of the term).

PRACH Configuration in NR

As mentioned above, transmission of the Physical Random Access Channel (PRACH) by the wireless device is used for wireless devices in IDLE and INACTIVE modes to gain access to the system. PRACH transmissions are also used for wireless devices in CONNECTED and INACTIVE modes to re-align UL timing and potentially for scheduling requests.

In NR 3GPP Rel-15, specific time/frequency locations (called PRACH occasions) are configured so that the wireless devices knows when it can transmit PRACH and the network node (e.g., gNB) knows when to listen for PRACH transmitted by wireless devices attempting to gain access to the system. In 3GPP TS 38.211 v 15.4.0, large tables (256 rows) of possible PRACH configurations are specified. As an example, PRACH Configuration Index 71 (Row 71) from Table 6.3.3.2-4 of 3GPP TS 38.211 v 15.4.0 for frequency range 2 (FR2) in unpaired (TDD) spectrum is given by:

TABLE 6.3.3

| | | 2-4 of 3GPP TS 38.211 v 15.4.0 | | | | | | |
|---|---|---|---|---|---|---|---|---|
| PRACH Config. | Preamble | $n_{SFN} \bmod x$ | | Slot | Starting | Number of PRACH slots within a 60 kHz | $N_t^{RA, slot}$, number of time-domain PRACH occasions within a PRACH | $N_{dur}^{RA}$, PRACH |
| Index | format | x | y | number | symbol | slot | slot | duration |
| 71 | A3 | 1 | 0 | 3, 5, 7 | 0 | 1 | 2 | 6 |

Cell Search and Initial Access Related Channels and Signals

For cell search and initial access, these channels are included: SS/PBCH block, PDSCH carrying RMSI/RAR/MSG4 scheduled by PDCCH channels carrying DCI, PRACH channels and PUSCH channel carrying MSG3.

Synchronization signal and PBCH block (SS/PBCH block, or SSB in shorter format) includes the signals PSS, SSS and PBCH DMRS, and PBCH. SSB may have 15 kHz, 30 kHz, 120 kHz or 240 kHz subcarrier spacing (SCS) depending on the frequency range.

This configuration uses PRACH preamble format A3 which has a time duration (last column of Table 6.3.3.2-4 of 3GPP TS 38.211 v 15.4.0) of 6 OFDM symbols. The values of x and y in the table specify that the PRACH configuration period is every x=1 radio frames (every 10 ms) with an offset of y=0 radio frame from the boundary of radio frame 0 (SFN 0). The slot numbers in the 5th column of the table specify that PRACH occasions appear in slots 3, 5, and 7 of the radio frame. These slots are defined based on a reference subcarrier spacing (SCS) of 60 kHz resulting in 40 slots. Hence, the 60 kHz slot numbers in each radio frame are indexed from 0 . . . 39.

In FR2, it can be flexibly configured whether PRACH uses 60 kHz or 120 kHz SCS. In this example, we assume that PRACH is configured with 120 kHz SCS, meaning that there are two 120 kHz PRACH slots per 60 kHz reference slot. The 7th column in Table 6.3.3.2-4 of 3GPP TS 38.211 v 15.4.0 specifies how many of the 120 kHz PRACH slots within each 60 kHz reference slot contain PRACH occasions. In this example, only one of the two PRACH slots is used, and the specification is hardwired to specify that the 2nd of the two slots is used.

The 8th column in Table 6.3.3.2-4 of 3GPP TS 38.211 v 15.4.0 indicates that for this configuration, there are 2 time domain PRACH occasions in the PRACH slot, each of duration 6 OFDM symbols (9th column of Table 6.3.3.2-4 of 3GPP TS 38.211 v 15.4.0). The 6th column indicates that the starting OFDM symbol index is 0 for the first of the two consecutive time-domain PRACH occasions in the PRACH slot for this configuration. FIG. 5 illustrates the time domain configuration for this example where time domain PRACH occasions corresponding to PRACH configuration index 73 for FR2 is provided where the SCS used for PRACH is 120 kHz.

Subcarrier Spacing for NR in Spectrum Beyond 52.6 GHz (3GPP Rel-17)

For extending NR beyond 52.6 GHz in 3GPP Rel-17, it is desirable to be able to support features for FR1 and FR2 as defined in NR 3GPP Rel-15/16 with minimal change (if possible) and support a common design structure that can support various use cases. To that extent, further considerations of using an integer ratio between clock rates of NR below and NR above 52.6 GHz is supported. The way this is achieved is to maintain the NR numerology scaling principle but extend to higher numerologies, i.e., $\Delta f=2^{\mu}\times15$ kHz with an appropriate range of possible integer values for p. Within the 3GPP Rel-17 work item for extending NR beyond 52.6 GHz, it discussed to possibly support new subcarrier spacings of 480 kHz ($\mu=5$) and 960 kHz ($\mu=6$), in addition to the 120 kHz ($\mu=3$) already supported for FR2 in 3GPP Rel-15/16.

By extending the subcarrier spacings to 480 kHz and 960 kHz, the slot duration shrinks. Hence, within the duration of one 60 kHz slot (reference SCS for PRACH configuration) there are eight 480 kHz slots and sixteen 960 kHz slots. The slot duration as a function of subcarrier spacing is illustrated in FIG. 6.

For operation in spectrum beyond 52.6 GHz, PRACH using subcarrier spacing 480 and 960 kHz is supported in 3GPP Rel-17; however, the current specifications (3GPP Rel-15/16) support only subcarrier spacing up to 120 kHz for PRACH.

In 3GPP Rel-15, the PRACH configuration table and supported specification procedures were designed assuming the maximum number of PRACH slots in a 60 kHz reference slot is 2. This reflects the ratio of the maximum SCS supported for PRACH (120 kHz) to the reference SCS (60 kHz).

Hence, it is currently unknown and/or undefined how to define PRACH configurations to support 480 kHz and 960 kHz where the subcarrier spacing ratio exceeds 2.

SUMMARY

Some embodiments advantageously provide methods, systems, and apparatuses for PRACH configurations that support modified subcarrier spacing (SCS) such as increased SCS of 480 kHz and/or 900 kHz.

One or more embodiments described herein reuse the existing PRACH configuration table for FR2 (designed for 60 kHz or 120 kHz SCS) also for 480/960 kHz subcarrier spacing, but redefine to some extent how the table contents of the existing PRACH configuration table for FR2 (designed for 60 kHz or 120 kHz SCS) should be interpreted. With the reinterpretations described herein, the existing table yields PRACH configurations appropriate for 480/960 kHz. In contrast to disadvantageously having to provide a complete redesign of the tables, which would be tedious and complicated, the rules for reinterpretation described herein can be short and concise, thereby reducing complexity for expanding to 480/960 kHz subcarrier spacing.

Two approaches to reinterpretation are described herein and are generally described as follows.

Retain the reference SCS for slot pattern (60 kHz) and modify rules for which (PRACH-SCS) slots within a 60 kHz slot are allocated for PRACH; and Redefine the reference SCS for slot pattern (480 kHz instead of 60 kHz).

One or more embodiments described herein provide for PRACH for 480 and 960 kHz to be supported without a complete redesign of the 3GPP Rel-15 PRACH configuration tables through a low complexity re-interpretation of one or more fields in the table(s) while still allowing flexibility in PRACH configuration. This can minimize the re-design of current network node and wireless device implementations to support the larger subcarrier spacings.

According to one aspect of the present disclosure, a wireless device is provided. The wireless device includes processing circuitry that operates to: select at least one slot from a plurality of slots that correspond to a first subcarrier spacing, SCS, greater than 120 kHz, each of the at least one slot including at least one physical random access channel, PRACH, occasion, and cause PRACH signaling based on the at least one slot.

According to one or more embodiments of this aspect, the plurality of slots correspond to a single reference slot of a 60 kHz reference SCS. According to one or more embodiments of this aspect, the first SCS is equal to 480 kHz. According to one or more embodiments of this aspect, the plurality of slots are numbered from 0-7 in ascending order where the at least one slot from the plurality of slots corresponds to one of: slot number 7; and slot numbers 3 and 7. According to one or more embodiments of this aspect, the first SCS is equal to 960 kHz.

According to one or more embodiments of this aspect, the plurality of slots are numbered from 0-15 in ascending order where the at least one slot from the plurality of slots corresponding to one of: slot number 15; and slot numbers 7 and 15.

According to one or more embodiments of this aspect, the at least one slot from the plurality of slots is based on a field in a table indicating at least a number of PRACH slots within a 60 kHz slot. According to one or more embodiments of this aspect, the processing circuitry is further configured to: receive signaling indicating at least one of: a start of a 60 kHz slot, a total number of slots of the plurality of slots, and each slot of the at least one slot of the plurality of slots, and the selection is based at least on the received signaling.

According to one or more embodiments of this aspect, the received signaling includes one of a start-length indicator value, SLIV, and a bitmap. According to one or more embodiments of this aspect, the plurality of slots correspond to a single reference slot of a reference SCS greater than 60 kHz. According to one or more embodiments of this aspect, the selection of the at least one slot from the plurality of slots is based at least on a scaling of at least one slot number indicated in a field in a table where the field in the table is configured to indicate reference slots within a 60 kHz reference SCS when no scaling is applied. According to one or more embodiments of this aspect, the selection of the at least one slot from the plurality of slots is based at least on a scaling of a system frame number, the scaled system frame number corresponding to a scaling of a time unit of a radio frame. According to one or more embodiments of this aspect, a total number of the plurality of slots is less than a total number of slots of associated with 120 kHz SCS.

According to another aspect of the present disclosure, a network node is provided. The network node includes processing circuitry configured to receive physical random access channel, PRACH, signaling based on at least one slot selected from a plurality of slots that correspond to a first subcarrier spacing, SCS, greater than 120 kHz where each of the at least one slot includes at least one PRACH occasion, and perform at least one action based at least on the PRACH signaling.

According to one or more embodiments of this aspect, the plurality of slots correspond to a single reference slot of a 60 kHz reference SCS. According to one or more embodiments of this aspect, the first SCS is equal to 480 kHz. According to one or more embodiments of this aspect, the plurality of slots are numbered from 0-7 in ascending order, the at least one slot from the plurality of slots corresponding to one of: slot number 7, and slot numbers 3 and 7. According to one or more embodiments of this aspect, the first SCS is equal to 960 kHz.

According to one or more embodiments of this aspect, the plurality of slots are numbered from 0-15 in ascending order, the at least one slot from the plurality of slots corresponding to one of: slot number 15; and slot numbers 7 and 15. According to one or more embodiments of this aspect, the at least one slot from the plurality of slots is based on a field in a table indicating at least a number of PRACH slots within a 60 kHz slot. According to one or more embodiments of this aspect, the processing circuitry is further configured to: cause signaling indicating at least one of: a start of a 60 kHz slot, a total number of slots of the plurality of slots, and each slot of the at least one slot of the plurality of slots, and the received PRACH signaling is based at least on the signaling of at least one indication. According to one or more embodiments of this aspect, the signaling includes one of a start-length indicator value, SLIV, and a bitmap.

According to one or more embodiments of this aspect, the plurality of slots correspond to a single reference slot of a reference SCS greater than 60 kHz. According to one or more embodiments of this aspect, the selection of the at least one slot from the plurality of slots is based at least on a scaling of at least one slot number indicated in a field in a table, and the field in the table is configured to indicate reference slots within a 60 kHz reference SCS when no scaling is applied. According to one or more embodiments of this aspect, the selection of the at least one slot from the plurality of slots is based at least on a scaling of a system frame number where the scaled system frame number corresponds to a scaling of a time unit of a radio frame. According to one or more embodiments of this aspect, a total number of the plurality of slots is less than a total number of slots of associated with 120 kHz SCS.

According to another aspect of the present disclosure, a method implemented by a wireless device is provided. At least one slot is selected from a plurality of slots that correspond to a first subcarrier spacing, SCS, greater than 120 kHz where each of the at least one slot includes at least one physical random access channel, PRACH, occasion. PRACH signaling is caused based on the at least one slot.

According to one or more embodiments of this aspect, the plurality of slots correspond to a single reference slot of a 60 kHz reference SCS. According to one or more embodiments of this aspect, the first SCS is equal to 480 kHz. According to one or more embodiments of this aspect, the plurality of slots are numbered from 0-7 in ascending order where the at least one slot from the plurality of slots corresponds to one of: slot number 7; and slot numbers 3 and 7. According to one or more embodiments of this aspect, the first SCS is equal to 960 kHz.

According to one or more embodiments of this aspect, the plurality of slots are numbered from 0-15 in ascending order where the at least one slot from the plurality of slots corresponding to one of: slot number 15; and slot numbers 7 and 15. According to one or more embodiments of this aspect, the at least one slot from the plurality of slots is based on a field in a table indicating at least a number of PRACH slots within a 60 kHz slot. According to one or more embodiments of this aspect, signaling is received that indicating at least one of: a start of a 60 kHz slot, a total number of slots of the plurality of slots, and each slot of the at least one slot of the plurality of slots, and the selection is based at least on the received signaling.

According to one or more embodiments of this aspect, the received signaling includes one of a start-length indicator value, SLIV, and a bitmap. According to one or more embodiments of this aspect, the plurality of slots correspond to a single reference slot of a reference SCS greater than 60 kHz. According to one or more embodiments of this aspect, the selection of the at least one slot from the plurality of slots is based at least on a scaling of at least one slot number indicated in a field in a table where the field in the table is configured to indicate reference slots within a 60 kHz reference SCS when no scaling is applied.

According to one or more embodiments of this aspect, the selection of the at least one slot from the plurality of slots is based at least on a scaling of a system frame number where the scaled system frame number corresponds to a scaling of a time unit of a radio frame. According to one or more embodiments of this aspect, a total number of the plurality of slots is less than a total number of slots of associated with 120 kHz SCS.

According to another aspect of the disclosure, a method implemented by a network node is provided. Physical random access channel, PRACH, signaling is received based on at least one slot selected from a plurality of slots that correspond to a first subcarrier spacing, SCS, greater than 120 kHz where each of the at least one slot including at least one PRACH occasion. At least one action is performed based at least on the PRACH signaling.

According to one or more embodiments of this aspect, the plurality of slots correspond to a single reference slot of a 60 kHz reference SCS. According to one or more embodiments of this aspect, the first SCS is equal to 480 kHz. According to one or more embodiments of this aspect, the plurality of slots are numbered from 0-7 in ascending order where the at least one slot from the plurality of slots corresponds to one of: slot number 7; and slot numbers 3 and 7. According to one or more embodiments of this aspect, the first SCS is equal to 960 kHz.

According to one or more embodiments of this aspect, the plurality of slots are numbered from 0-15 in ascending order where the at least one slot from the plurality of slots correspond to one of: slot number 15; and slot numbers 7 and 15. According to one or more embodiments of this aspect, the at least one slot from the plurality of slots is based on a field in a table indicating at least a number of PRACH slots within a 60 kHz slot. According to one or more embodiments of this aspect, signaling is caused that where the signaling indicates at least one of: a start of a 60 kHz slot, a total number of slots of the plurality of slots, and each slot of the at least one slot of the plurality of slots, and where the received PRACH signaling is based at least on the signaling of at least one indication.

According to one or more embodiments of this aspect, the signaling includes one of a start-length indicator value, SLIV, and a bitmap. According to one or more embodiments of this aspect, the plurality of slots correspond to a single reference slot of a reference SCS greater than 60 kHz. According to one or more embodiments of this aspect, the selection of the at least one slot from the plurality of slots is based at least on a scaling of at least one slot number indicated in a field in a table where the field in the table is configured to indicate reference slots within a 60 kHz reference SCS when no scaling is applied. According to one or more embodiments of this aspect, the selection of the at least one slot from the plurality of slots is based at least on a scaling of a system frame number where the scaled system frame number corresponds to a scaling of a time unit of a radio frame. According to one or more embodiments of this aspect, a total number of the plurality of slots is less than a total number of slots of associated with 120 kHz SCS.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 9 is a flowchart illustrating exemplary methods implemented in a communication system including a host computer, a network node and a wireless device for executing a client application at a wireless device according to some embodiments of the present disclosure;

FIG. 10 is a flowchart illustrating exemplary methods implemented in a communication system including a host computer, a network node and a wireless device for receiving user data at a wireless device according to some embodiments of the present disclosure;

FIG. 13 is a flowchart of an example process in a network node according to some embodiments of the present disclosure;

FIG. 14 is a flowchart of another example process in a network node according to some embodiments of the present disclosure;

FIG. 18 is a diagram of PRACH slots according to a reinterpretation of the configuration table for the case when the number of PRACH slots within a 60 GHz slot is set equal to 2 according to some embodiments of the present disclosure;

FIG. 19 is a diagram of PRACH slots according to another reinterpretation of the configuration table for the case when the number of PRACH slots within a 60 GHz slot is set equal to 2 according to some embodiments of the present disclosure;

FIG. 20 is a diagram of PRACH slots according to another reinterpretation of the configuration table for the case when the number of PRACH slots within a 60 GHz slot is set equal to 2 according to some embodiments of the present disclosure;

FIG. 21 is a diagram of PRACH slots according to another reinterpretation of the configuration table for the case when the number of PRACH slots within a 60 GHz slot is set equal to 2 according to some embodiments of the present disclosure;

FIG. 22 is a diagram of PRACH slots according to a reinterpretation of the configuration table with 480 kHz slots allocated for PRACH in each 60 kHz slot using a bit map according to some embodiments of the present disclosure;

FIG. 23 is a diagram of PRACH slots according to a reinterpretation of the configuration table for the case when the reference SCS is 480 kHz according to some embodiments of the present disclosure;

DETAILED DESCRIPTION

Figures 1, 2:
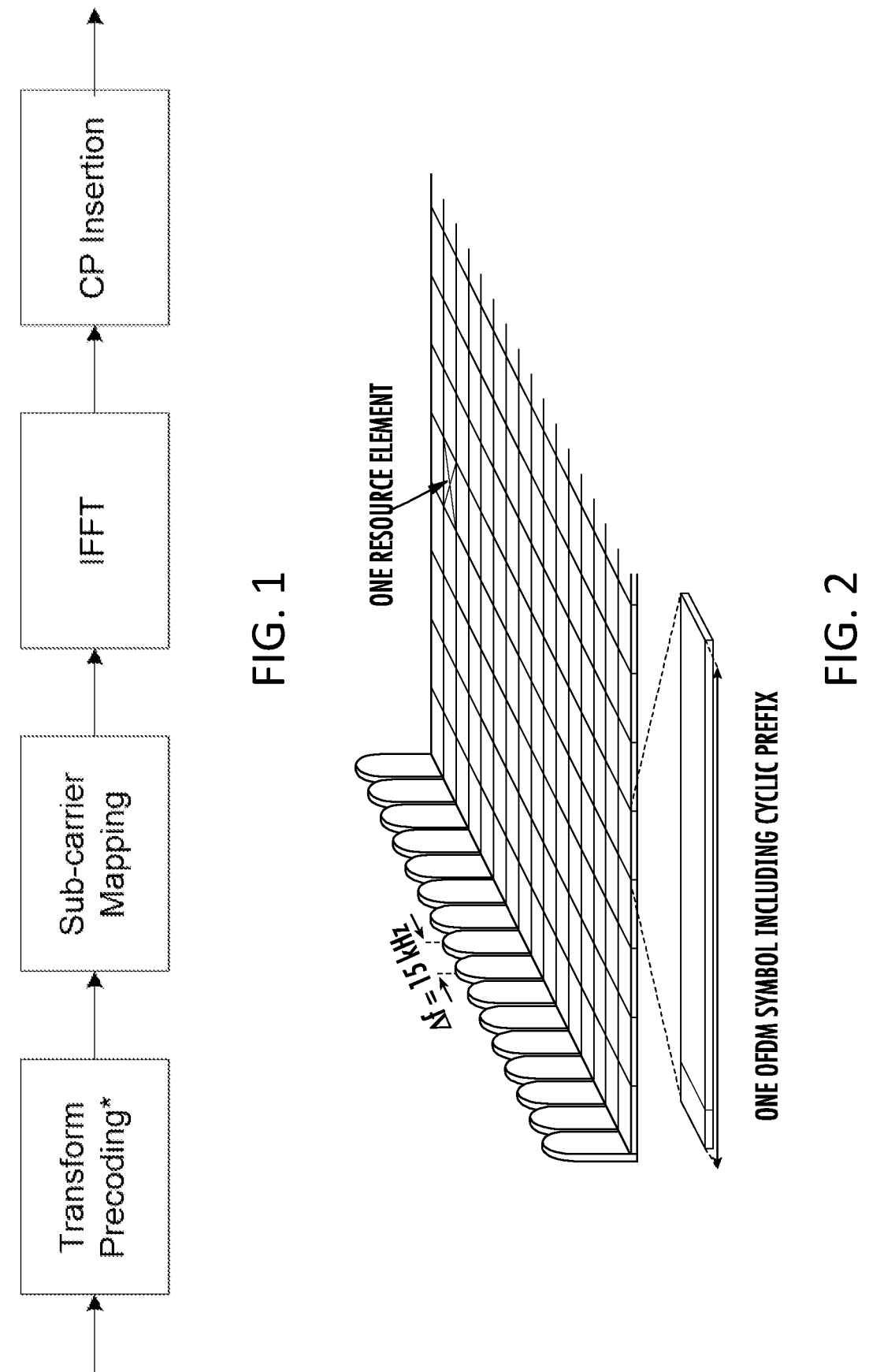
FIG. 1 is a NR transmitter block diagram for CP-OFDM with optional DFT-spreading.
FIG. 2 is a NR downlink physical resource for 15 kHz sub-carrier spacing numerology.
Figure 3:
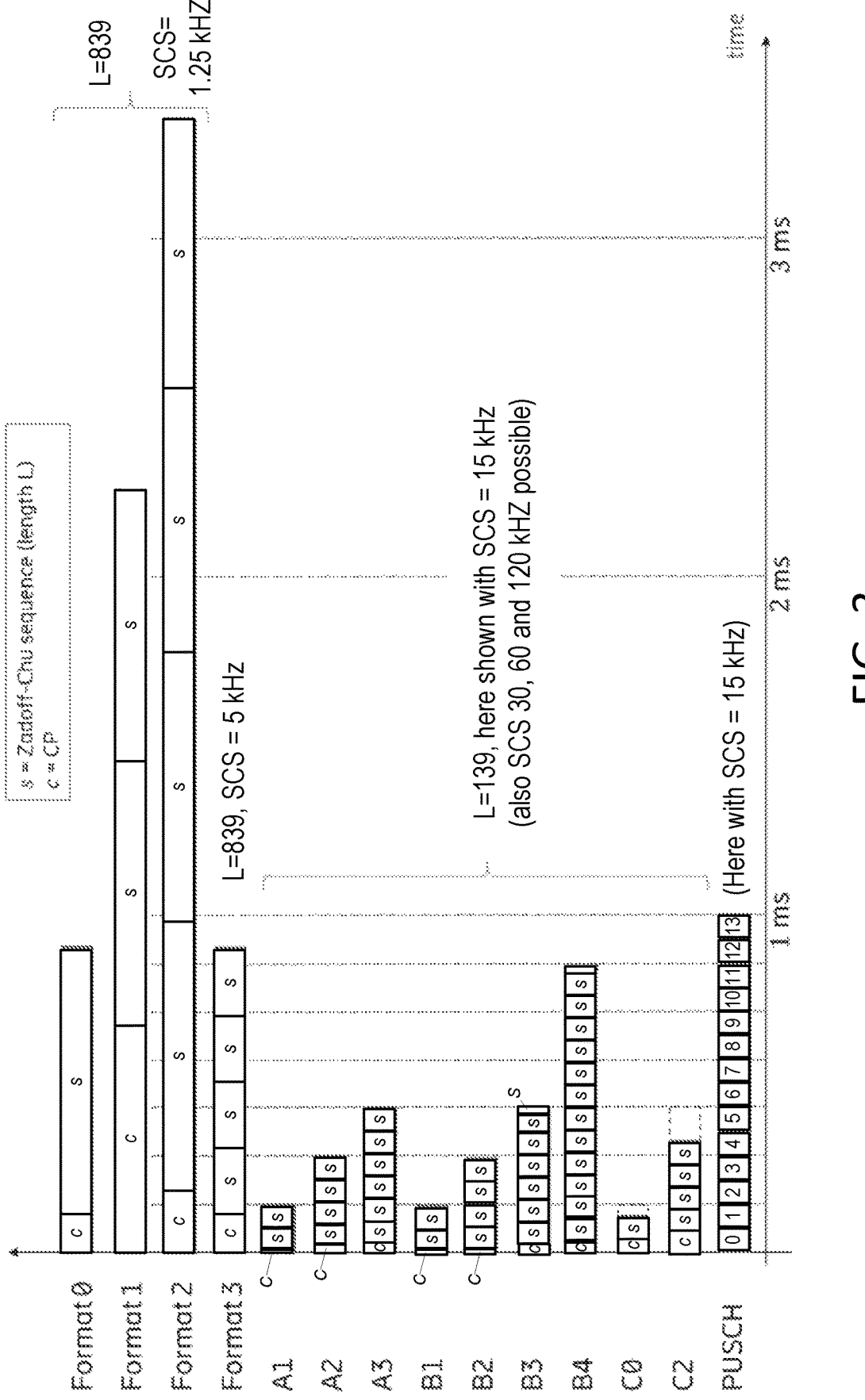
FIG. 3 is a diagram of a NR 3GPP Rel-15 PRACH formats.
Figure 4:
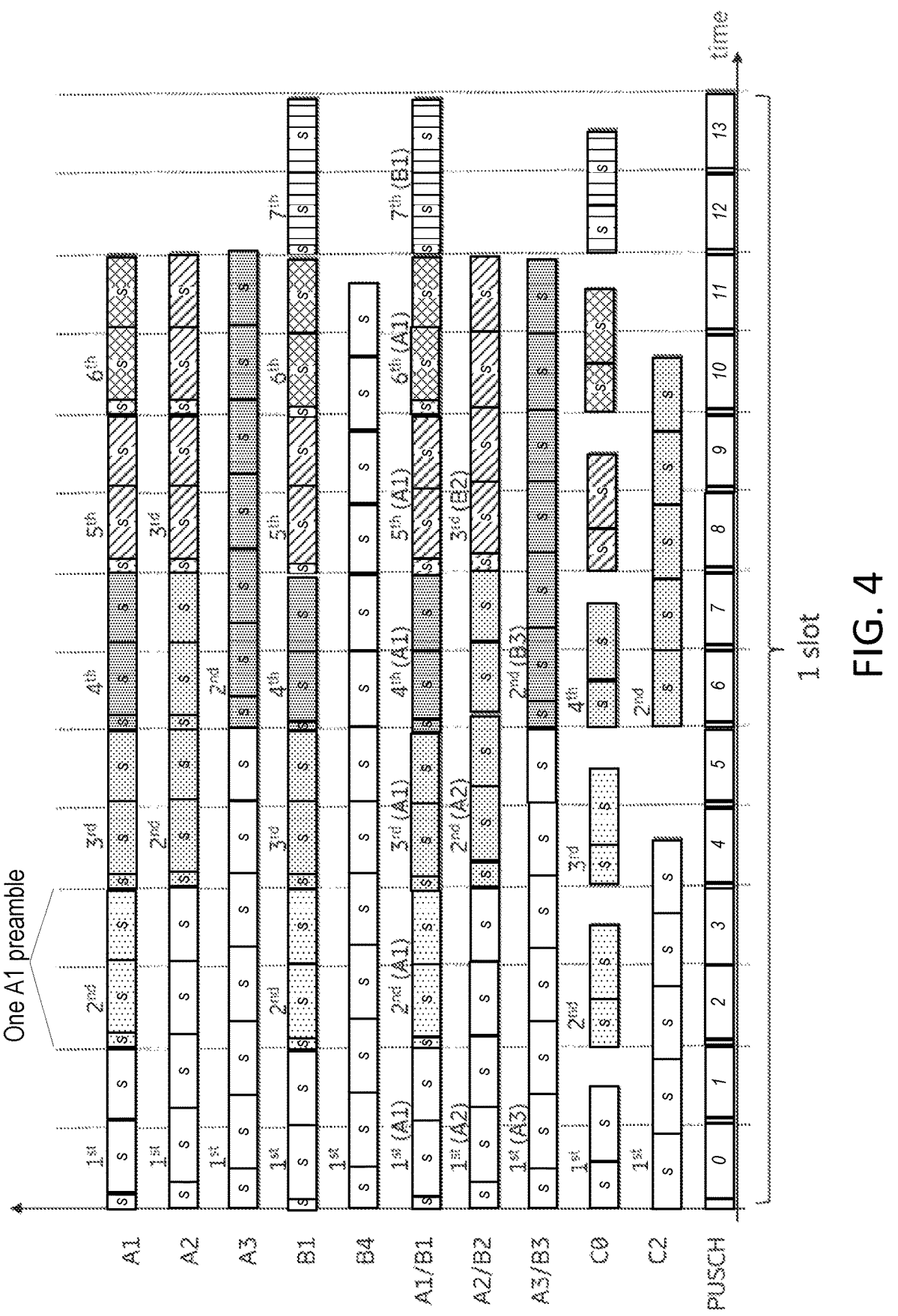
FIG. 4 is a diagram of a NR Rel-15 PRACH allocations within a slot where the PUSCH is illustrated for comparison.
Figure 5:
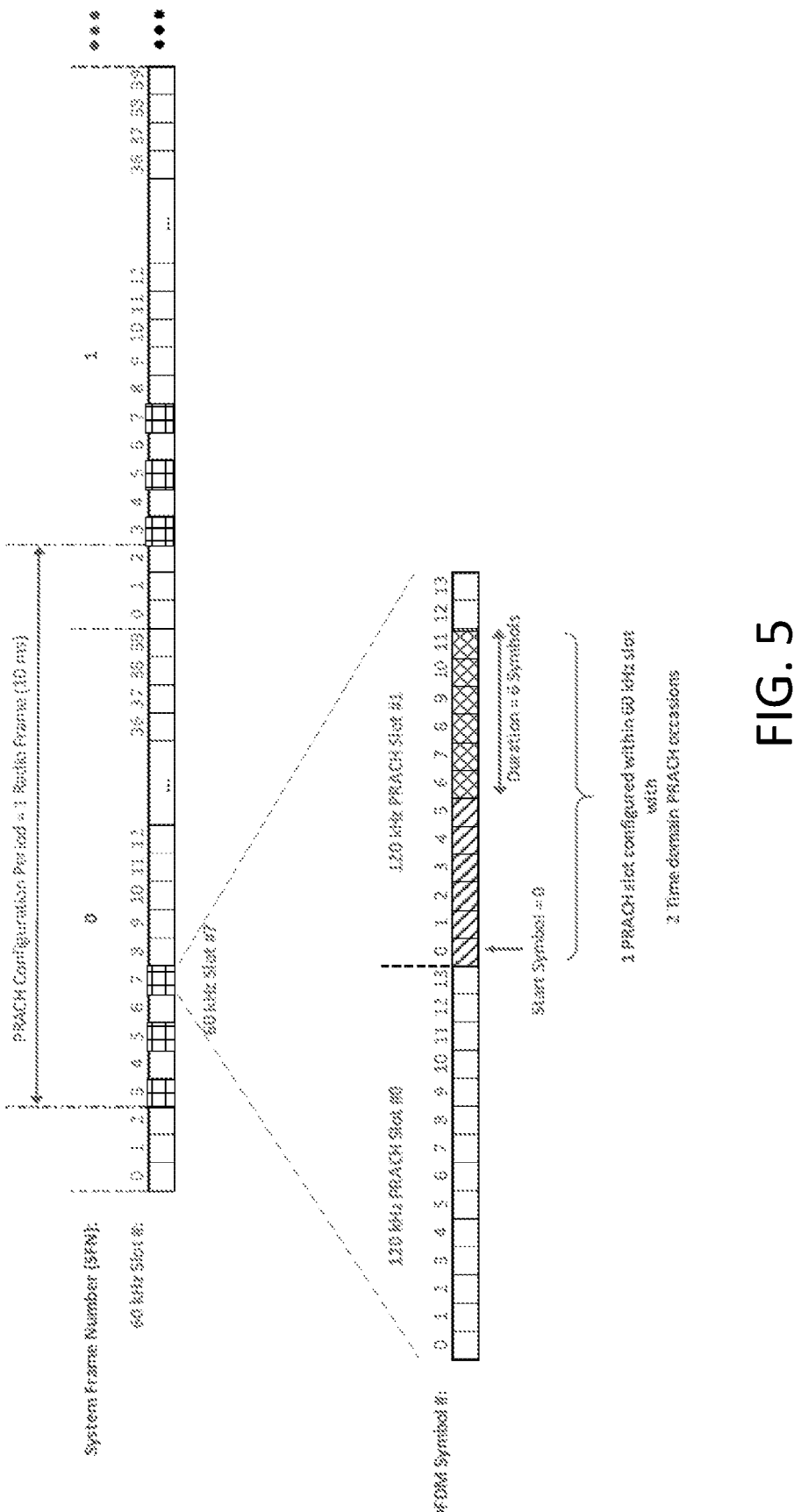
FIG. 5 is a diagram of time domain PRACH occasions corresponding to PRACH configuration index 73 for FR2 in which the SCS used for PRACH is 120 kHz.

Before describing in detail example embodiments, it is noted that the embodiments reside primarily in combinations of apparatus components and processing steps related to PRACH configurations that support modified SCS such as increased SCS of 480 kHz and/or 900 kHz. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration and/or use a modified configuration and/or to interpret a configuration table in a different manner than previously defined. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., configuration data. Configuring a terminal may include sending configuration data to the terminal indicating which PRACH configuration to use.

Reference to "table" or "configuration table" for reinterpretation may refer to a table defining one or more PRACH configuration. Examples of the table are provided herein.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 7:
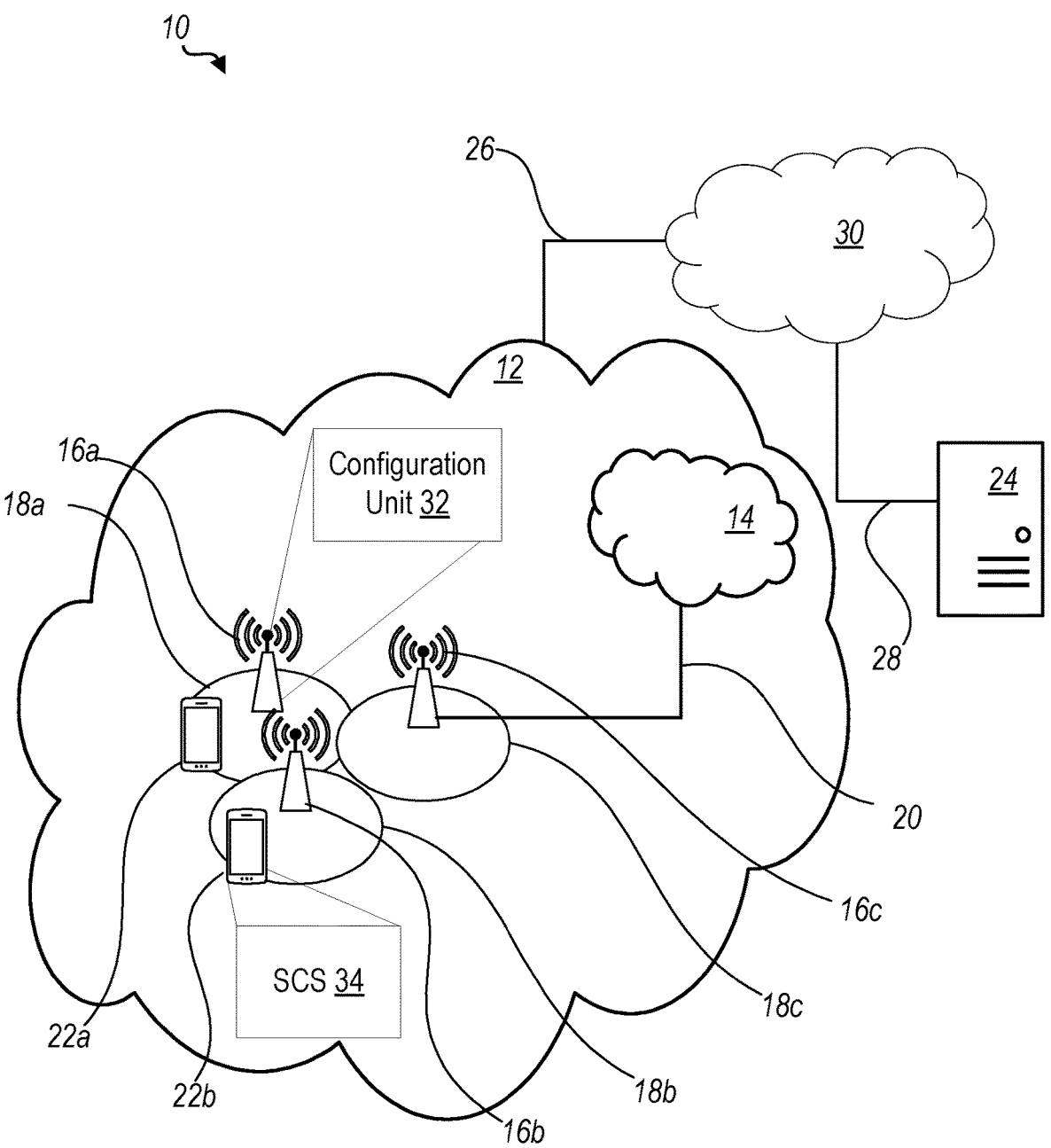
FIG. 7 is a schematic diagram of an exemplary network architecture illustrating a communication system connected via an intermediate network to a host computer according to the principles in the present disclosure.

Some embodiments provide PRACH configurations that support modified SCS such as increased SCS of 480 kHz and/or 900 kHz, as described herein. Referring again to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to perform one or more network node 16 function as described herein such as with respect to PRACH configurations that support modified SCS such as increased SCS of 480 kHz and/or 900 kHz. A wireless device 22 is configured to include a SCS unit 34 which is configured to perform one or more wireless device 22 functions as described herein such as with respect to PRACH configurations that support modified SCS such as increased SCS of 480 kHz and/or 900 kHz.

Example implementations, in accordance with an embodiment, of the WD 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured and/or operate to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of transmit, receive, modifying, relay, forward, process, store, determine, analyze, etc., information related to PRACH configurations that support modified SCS such as increased SCS of 480 kHz and/or 900 kHz.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform one or more network node 16 function as described herein such as with respect to PRACH configurations that support modified SCS such as increased SCS of 480 kHz and/or 900 kHz.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a SCS unit 34 configured to perform one or more wireless device 22 functions as described herein such as with respect to PRACH configurations that support modified SCS such as increased SCS of 480 kHz and/or 900 kHz.

Figure 8:
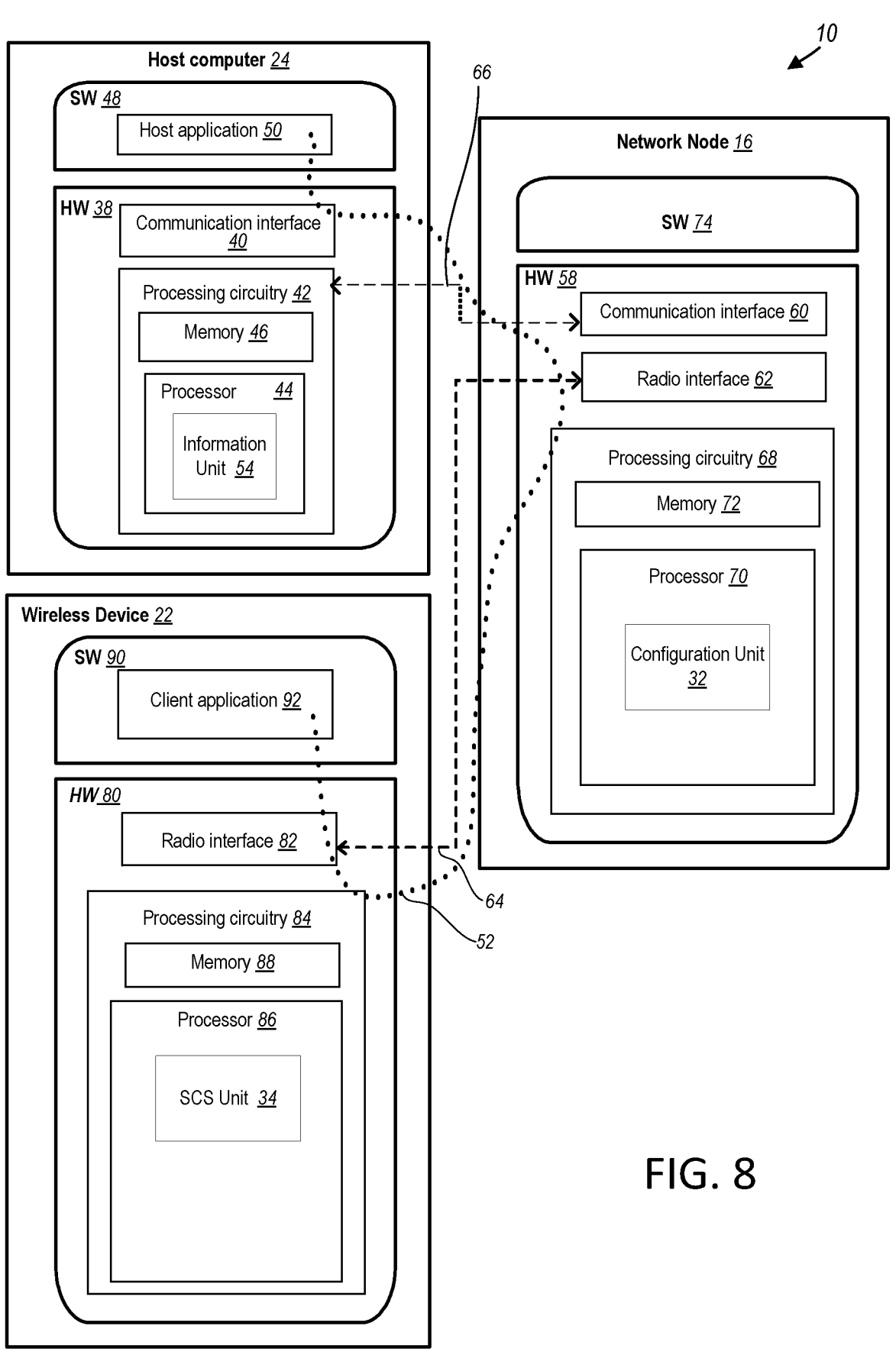
FIG. 8 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 8 and independently, the surrounding network topology may be that of FIG. 7.

In FIG. 8, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signal-ing facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 8 show various "units" such as configuration unit 32, and SCS unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 9 is a flowchart illustrating an exemplary method implemented in a communication system, such as, for example, the communication system of FIGS. 7 and 8, in accordance with one embodiment. The communication system may include a host computer 24, a network node 16 and a WD 22, which may be those described with reference to FIG. 8. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 10 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 11, 12:
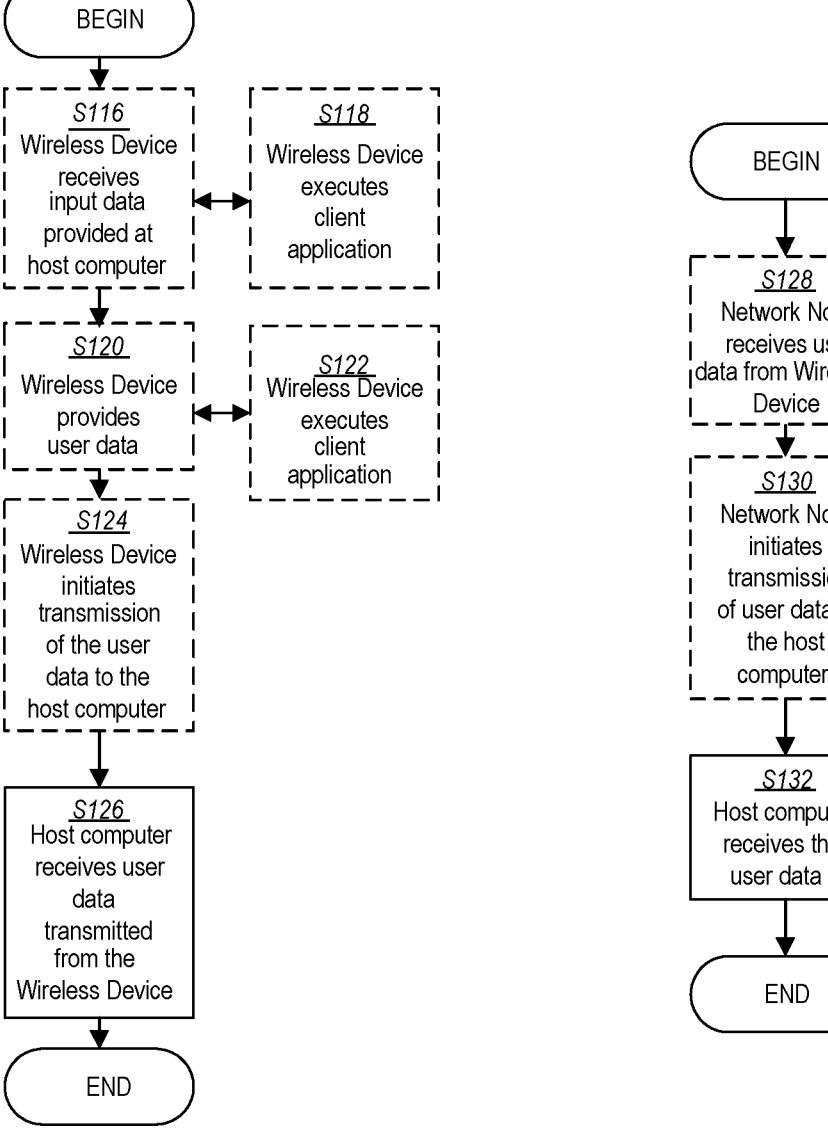
FIG. 11 is a flowchart illustrating exemplary methods implemented in a communication system including a host computer, a network node and a wireless device for receiving user data from the wireless device at a host computer according to some embodiments of the present disclosure.
FIG. 12 is a flowchart illustrating exemplary methods implemented in a communication system including a host computer, a network node and a wireless device for receiving user data at a host computer according to some embodiments of the present disclosure.

FIG. 11 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 12 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

FIG. 13 is a flowchart of an example process in a network node 16 according to some embodiments of the present disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 is configured to configure (Block S134) a physical random access channel, PRACH, configuration to support a subcarrier spacing, SCS, of at least 480 kHz, as described herein. In one or more embodiments, network node 16 is configured to signal (Block S136) the PRACH configuration to the wireless device for implementation, as described herein.

According to one or more embodiments, the configured PRACH configuration is based on a reinterpretation of a configuration table that defines a plurality of predefined random access configurations associated with one of a 60 kHz SCS and 120 kHz SCS. According to one or more embodiments, the reinterpretation includes retaining a reference SCS of 60 kHz for a slot pattern and modifying at least one rule for which slots within a 60 kHz slot are allocated for PRACH. According to one or more embodiments, the reinterpretation includes redefining a reference SCS of 60 kHz for a slot pattern of at least 480 kHz.

FIG. 14 is a flowchart of another example process in a network node 16 according to some embodiments of the present disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 is configured to configured receive (Block S138) physical random access channel, PRACH, signaling based on at least one slot selected from a plurality of slots that correspond to a first subcarrier spacing, SCS, greater than 120 kHz where each of the at least one slot includes at least one PRACH occasion, as described herein. Network node 16 is configured to perform (Block S140) at least one action based at least on the PRACH signaling, as described herein.

According to one or more embodiments, the plurality of slots correspond to a single reference slot of a 60 kHz reference SCS. According to one or more embodiments, the first SCS is equal to 480 kHz. According to one or more embodiments, the plurality of slots are numbered from 0-7 in ascending order, the at least one slot from the plurality of slots corresponding to one of: slot number 7, and slot numbers 3 and 7. According to one or more embodiments, the first SCS is equal to 960 kHz.

According to one or more embodiments, the plurality of slots are numbered from 0-15 in ascending order, the at least one slot from the plurality of slots corresponding to one of: slot number 15; and slot numbers 7 and 15. According to one or more embodiments, the at least one slot from the plurality of slots is based on a field in a table indicating at least a number of PRACH slots within a 60 kHz slot. According to one or more embodiments, the processing circuitry is further configured to: cause signaling indicating at least one of a start of a 60 kHz slot, a total number of slots of the plurality of slots, and each slot of the at least one slot of the plurality of slots, and the received PRACH signaling is based at least on the signaling of at least one indication.

According to one or more embodiments, the signaling includes one of a start-length indicator value, SLIV, and a bitmap. According to one or more embodiments, the plurality of slots correspond to a single reference slot of a reference SCS greater than 60 kHz. According to one or more embodiments, the selection of the at least one slot from the plurality of slots is based at least on a scaling of at least one slot number indicated in a field in a table, and the field in the table is configured to indicate reference slots within a 60 kHz reference SCS when no scaling is applied.

According to one or more embodiments, the selection of the at least one slot from the plurality of slots is based at least on a scaling of a system frame number where the scaled system frame number corresponds to a scaling of a time unit of a radio frame. According to one or more embodiments, a total number of the plurality of slots is less than a total number of slots of associated with 120 kHz SCS.

Figure 15:
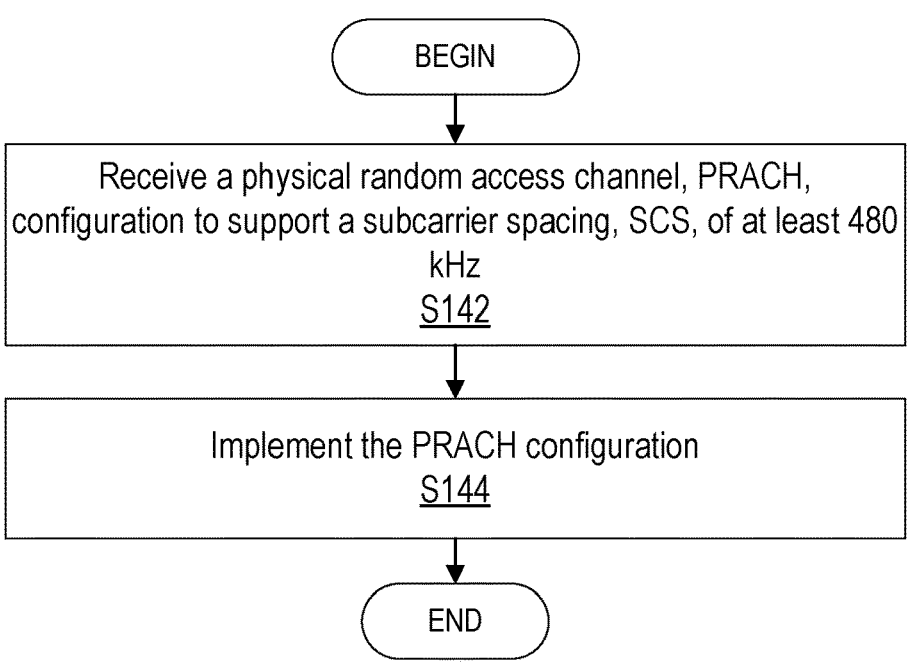
FIG. 15 is a flowchart of an example process in a wireless device according to some embodiments of the present disclosure.

FIG. 15 is a flowchart of an example process in a wireless device 22 according to some embodiments of the present disclosure. One or more Blocks and/or functions performed by wireless device 22 may be performed by one or more elements of wireless device 22 such as by SCS unit 34 in processing circuitry 84, processor 86, radio interface 82, etc. In one or more embodiments, wireless device 22 is configured to receive (Block S142) a physical random access channel, PRACH, configuration to support a subcarrier spacing, SCS, of at least 480 kHz, as described herein. In one or more embodiments, wireless device 22 is configured to implement (Block S144) the PRACH configuration, as described herein.

According to one or more embodiments, the PRACH configuration is based on a reinterpretation of a configuration table that defines a plurality of predefined random access configurations associated with one of a 60 kHz SCS and 120 kHz SCS. According to one or more embodiments, the reinterpretation includes retaining a reference SCS of 60 kHz for a slot pattern and modifying at least one rule for which slots within a 60 kHz slot are allocated for PRACH. According to one or more embodiments, the reinterpretation includes redefining a reference SCS of 60 kHz for a slot pattern of at least 480 kHz.

Figure 16:
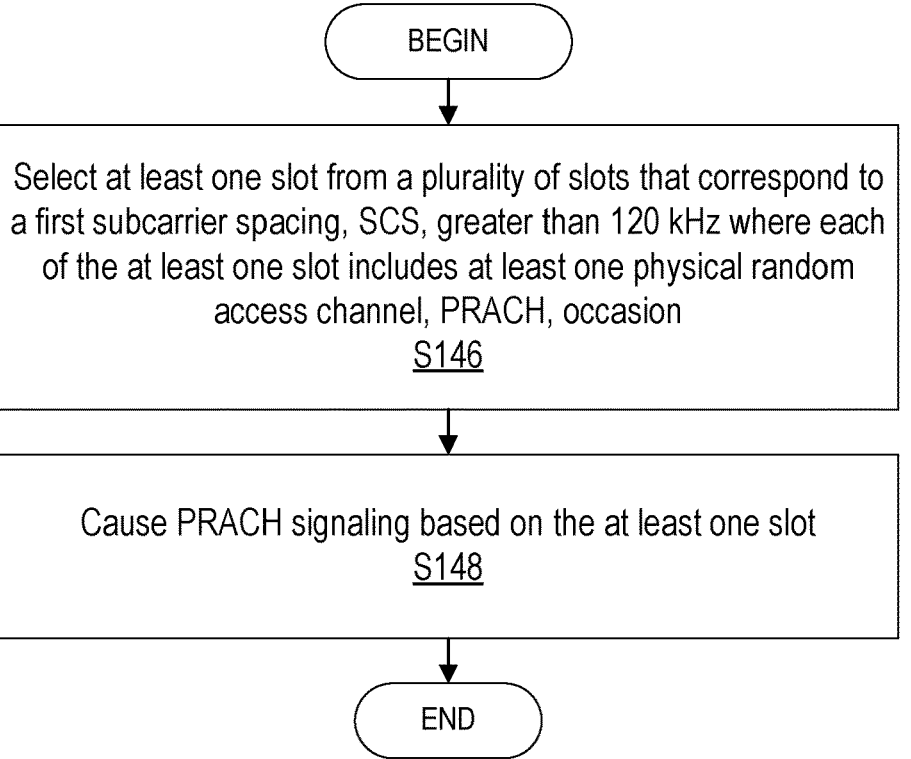
FIG. 16 is a flowchart of another example process in a wireless device according to some embodiments of the present disclosure.

FIG. 16 is a flowchart of another example process in a wireless device 22 according to some embodiments of the present disclosure. One or more Blocks and/or functions performed by wireless device 22 may be performed by one or more elements of wireless device 22 such as by SCS unit 34 in processing circuitry 84, processor 86, radio interface 82, etc. In one or more embodiments, wireless device 22 is configured to select (Block S146) at least one slot from a plurality of slots that correspond to a first subcarrier spacing, SCS, greater than 120 kHz where each of the at least one slot includes at least physical random access channel, PRACH, occasion, as described herein. Wireless device 22 is configured to cause (Block S148) PRACH signaling based on the at least one slot, as described herein.

According to one or more embodiments, the plurality of slots correspond to a single reference slot of a 60 kHz reference SCS. According to one or more embodiments, the first SCS is equal to 480 kHz. According to one or more embodiments, the plurality of slots are numbered from 0-7 in ascending order, the at least one slot from the plurality of slots corresponding to one of: slot number 7; and slot numbers 3 and 7.

According to one or more embodiments, the first SCS is equal to 960 kHz. According to one or more embodiments, the plurality of slots are numbered from 0-15 in ascending order, the at least one slot from the plurality of slots corresponding to one of: slot number 15; and slot numbers 7 and 15. According to one or more embodiments, the at least one slot from the plurality of slots is based on a field in a table indicating at least a number of PRACH slots within a 60 kHz slot.

According to one or more embodiments, the processing circuitry 84 is further configured to: receive signaling indicating at least one of a start of a 60 kHz slot, a total number of slots of the plurality of slots, and each slot of the at least one slot of the plurality of slots, and the selection is based at least on the received signaling. According to one or more embodiments, the received signaling includes one of a start-length indicator value, SLIV, and a bitmap. According to one or more embodiments, the plurality of slots correspond to a single reference slot of a reference SCS greater than 60 kHz.

According to one or more embodiments, the selection of the at least one slot from the plurality of slots is based at least on a scaling of at least one slot number indicated in a field in a table where the field in the table is configured to indicate reference slots within a 60 kHz reference SCS when no scaling is applied. According to one or more embodiments, the selection of the at least one slot from the plurality of slots is based at least on a scaling of a system frame number where the scaled system frame number corresponds to a scaling of a time unit of a radio frame. According to one or more embodiments, a total number of the plurality of slots is less than a total number of slots of associated with 120 kHz SCS.

Having generally described arrangements for PRACH configurations that support modified SCS such as increased SCS of 480 kHz and/or 900 kHz, details for these arrangements, functions and processes are provided as follows, and which may be implemented by the network node 16 and/or wireless device 22. In particular, one or more network node 16 functions described below may be performed by one or more of processing circuitry 68, processor 70, configuration unit 32, radio interface 62, etc. Further, one or more wireless device 22 functions described below may be performed by one or more of processing circuitry 84, SCS unit 34, processor 86, radio interface 82, etc.

Some embodiments provide PRACH configurations that support modified SCS such as increased SCS of 480 kHz and/or 900 kHz. One or more embodiments described herein reuse the existing PRACH configuration table for FR2 (designed for 60 kHz or 120 kHz subcarrier spacing) also for 480/960 kHz subcarrier spacing (SCS) where at least some of the table contents are redefined with respect to how it should be interpreted. With the reinterpretations described herein, the existing table yield PRACH configurations appropriate for 480/960 kHz. In contrast to a complete redesign of the tables, which would be tedious and complicated/highly complex, the rules for reinterpretation can be of low complexity.

Note that while the discussion herein is with respect to the specific subcarrier spacings 60 kHz, 120 kHz, 480 kHz, and 960 kHz, the teachings described herein are equally applicable to other sets of subcarrier spacings, especially if some or all of the subcarrier spacings are integer multiples of other subcarrier spacings. In particular, the same ideas could be applied if a subcarrier spacing of 240 kHz or 1920 kHz were introduced.

It should also be noted that the reinterpretation could be complemented by actual (minor) changes to the table contents, which may require changes to the 3GPP specification.

Moreover, it should be noted that several of the reinterpretations could alternatively, but technically equivalently, fully or partly be expressed in terms of a systematic modification of the table contents according to the rules for reinterpretation described herein.

As described below, in one or more embodiments, "table" or "configuration table" may correspond to Table 6.3.3.2-4 from 3GPP 38.211 v 15.4.0. Further, while specific titles for table columns are recited below in quotes, one of ordinary skill in the art will recognize that the naming conventions may change in the future but the functionality (e.g., slot numbers, Number of PRACH slots within a 60 kHz slot, etc.) associated with the column may not, where the teaching descried herein are equally applicable to other tables associated with the column functionality described herein.

Example #1—Retain Reference SCS for PRACH Slot (60 kHz)

Figure 6:
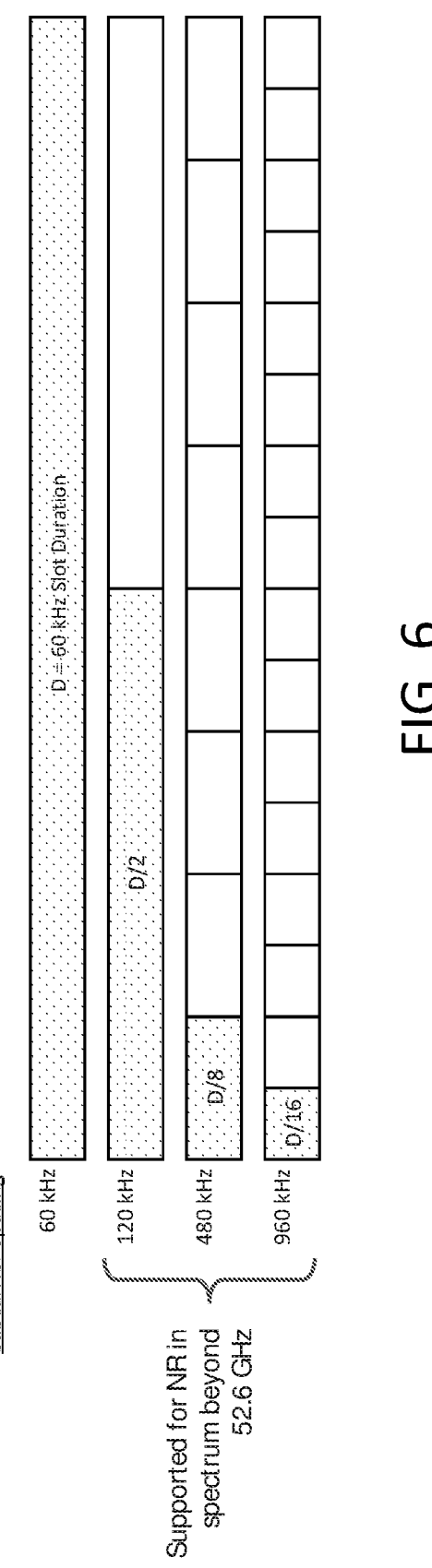
FIG. 6 is a diagram for slot durations for different subcarrier spacings.

In one or more embodiments, table column "Slot numbers" of the table still refers to 60 kHz slots, i.e., the reference slot SCS is still 60 kHz. As seen in the example of FIG. 6, this means that there are more than two 480/960 kHz slots within each 60 kHz slot. There is then a need to specify which 480/960 kHz slot(s) should be used for (allocated to) PRACH. The choice could either be fixed in the standard or (to some extent) signaled (for example, be via RMSI for initial access and RRC for connected mode), as discussed in more detail below.

Example #1-1—Allocation within 60 kHz Slots is Fixed

In order to help minimize signaling, it could be beneficial to fix the slot(s) to be allocated to PRACH. One approach is then to let the PRACH slot allocation be derived, in some pre-defined manner, from, for example, one or more of:

the PRACH SCS (480 kHz and 960 kHz), and/or the value in the configuration table column "Number of PRACH slots within a 60 kHz slot", henceforth referred to as N, and/or the PRACH format, and/or other column values in the table, and/or other parameters.

Note that the number of slots allocated such as by network node 16 to PRACH in each 60 kHz slot could, but need not necessarily, equal N.

Figure 17:
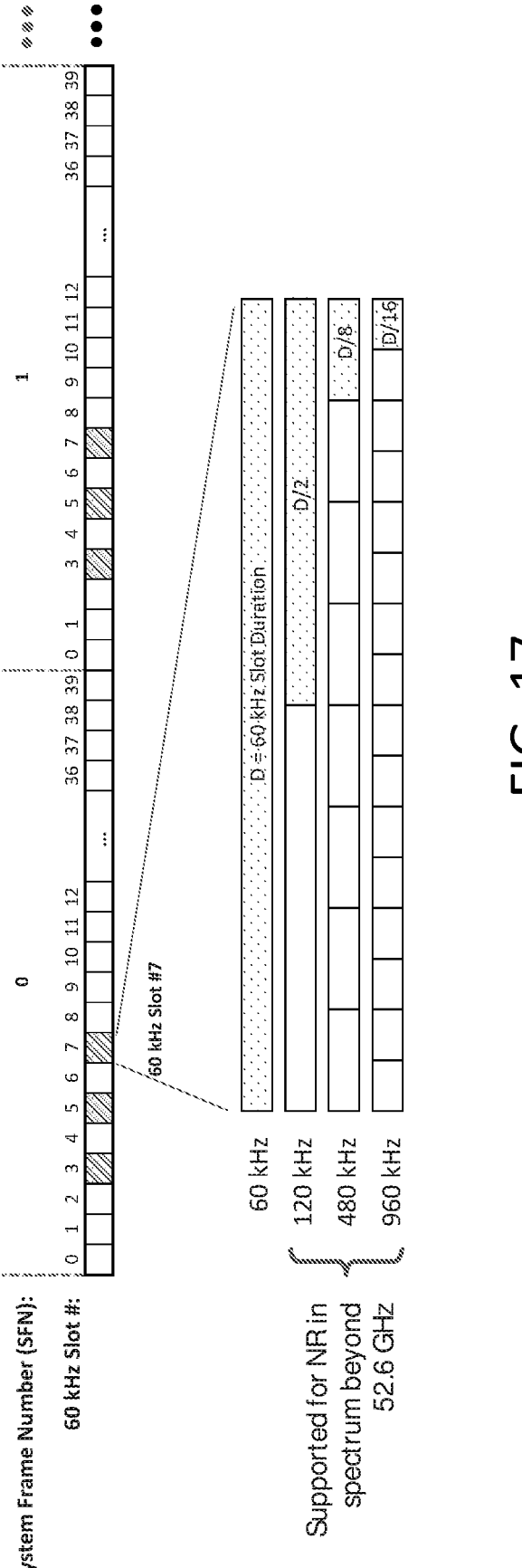
FIG. 17 is a diagram of PRACH slots according to a reinterpretation of the configuration table for the case when a number of PRACH slots within a 60 Ghz slot equal to 1 according to some embodiments of the present disclosure.

In one sub-embodiment, PRACH configurations with N=1 (i.e., "Number of PRACH slots within a 60 GHz slot" equals to 1) are defined to use only the last 480/960 kHz slot of each 60 kHz slot for PRACH. In FIG. 17, this is illustrated for 480 kHz SCS as well as for 960 kHz, along with an illustration of the allocations for 60 kHz and 120 kHz SCS already defined in the 3GPP Rel-15/16 of the standard.

In general, it may be preferable to avoid PRACH slot allocations that require higher PRACH processing load (operations per unit time) than would be needed if the SCS were 60 kHz or 120 kHz. The processing that may be needed for one PRACH slot can in a first approximation be assumed to be the same irrespective of the used SCS. Hence, if only a single 480/960 kHz PRACH slot is allocated within any given 60 kHz slot, the processing load is guaranteed to be approximately the same as for 120 kHz PRACH SCS with N=1 or for 60 kHz PRACH SCS.

If, on the other hand, multiple PRACH slots are allocated within a 60 kHz reference slot, it may, in order to avoid higher peaks in processing load than with 120 kHz SCS, help to ensure that the allocated PRACH slots are separated in time by at least the distance between two 120 kHz slots, i.e., the time interval from the starting point of one 480/960 kHz PRACH slot to the next 480/960 kHz PRACH slot should be at least the duration of a 120 kHz slot). In order to fulfil this, a necessary condition is that there is at most one 480/960 kHz PRACH slot allocated in each 120 kHz slot within a 60 kHz slot. Furthermore, if several consecutive 60 kHz slots are indicated for PRACH use (e.g., several consecutive numbers listed in the "Slot number" column), it may be helpful to ensure that the last 480/960 kHz slot allocated such as by network node 16 to PRACH in one 60 kHz slot is not too close to the first 480/960 kHz slot in the next 60 kHz slot. One way of meeting all these requirements is to always allocate the same 480/960 kHz slot within a 120 kHz slot to PRACH. This could, for example, be the last slot as illustrated in FIG. 18 where the configuration table is reinterpreted for the case where a number of PRACH slots within a 60 GHz slot are set equal to 2 and only the last 480/960 kHz slot within the 120 kHz slot is allocated to PRACH. An alternative could be the first slot as illustrated in FIG. 19 where the table is reinterpreted for the case where the number of PRACH slots within a 60 GHz slot are set equal to 2 and only the first 480/960 kHz slot within a 120 kHz slot is allocated to the PRACH, or any other fixed 480/960 kHz slot within the 120 kHz slot.

In one sub-embodiment, N=2, which is chosen if the value 2 appears in the existing 3GPP Rel-15 table column "Number of PRACH slots within a 60 kHz slot". N=2 is defined to mean that the last 480/960 kHz slot in each 120 kHz slot of each 60 kHz slot listed in the "Slot number" column of the existing 3GPP Rel-15 table is allocated to PRACH. For example, this could be achieved by extending and/or modifying the text in 3GPP TS 38.211, section 5.3.2, as follows (bold text used for changes) (corresponds to the example in FIG. 18):

"$n_{slot}^{RA}$ is given by if $\Delta f_{RA} \in \{1.25, 5, 15, 60\}$ kHz, then $n_{slot}^{RA}=0$ if $\Delta \{30,120\}$ kHz and either of "Number of PRACH slots within a subframe" in Tables 6.3.3.2-2 to 6.3.3.2-3 or "Number of PRACH slots within a 60 kHz slot" in Table 6.3.3.2-4 is equal to 1, then $n_{slot}^{RA}=1$ if $\Delta f_{RA}=480$ kHz and "Number of PRACH slots within a 60 kHz slot" in Table 6.3.3.2-4 is equal to 2, then $n_{slot}^{RA}=\{3, 7\}$ if $\Delta f_{RA}=960$ kHz and "Number of PRACH slots within a 60 kHz slot" in Table 6.3.3.2-4 is equal to 2, then $n_{slot}^{RA}=\{7, 15\}$ otherwise, $n_{slot}^{RA} \in \{0, 1\}$"

Analogous additions could be made to handle the case of N=1. In particular, FIG. 17 provides one example of PRACH slots when N=1.

In one preferred sub-embodiment, the indication of how many and/or which 480/960 kHz slots within a 60 kHz slot are allocated to PRACH is indicated in an extra column added to the PRACH configuration table. This allows for larger flexibility than a general rule or function as discussed above, but at the expense of larger specification effort and complexity.

Example #1-2—Allocation within 60 kHz Slots is Signaled

For maximum and/or increased flexibility, the set of 480/960 kHz slots within each 60 kHz to allocate to PRACH could be signaled via dedicated signaling (RRC) or broadcast signaling (System Information) (in addition to the PRACH configuration index, which is signaled already as defined in 3GPP Rel-15/16). The signaling could be achieved in several different ways, and may be signaled by network node 16, as described below.

In one sub-embodiment, the set of 480/960 kHz PRACH slots within a 60 kHz slot are always consecutive, and the starting 480/960 kHz slot X (index relative to the start of the 60 kHz slot) and the number of 480/960 kHz slots Y in the set are signaled, either separately encoded or jointly encoded into one start-length-indicator value (SLIV). An example with X=2 and Y=3 for SCS 480 kHz is illustrated in FIG. 20 (with 480 kHz slot numbering starting from index 0 where the interpretation of the configuration table is for the case where "Number of PRACH slots within a 60 Ghz slot" is equal to 2). Alternatively, X could be relative to the start of a 120 kHz slot, and the set of 120 kHz slots to use could be signaled separately such as by network node 16 or be fixed in the standard (for example in the same way as for FR2 in 3GPP Rel-15/16, or in some other way).

In one sub-embodiment, there is always a maximum of one 480/960 kHz slot within a 120 kHz slot allocated to PRACH. Then only a single slot index X (starting 480/960 kHz slot relative to start of 120 kHz slot) may need to be signaled. Alternatively, X could be relative to the start of the 60 kHz slot.

In one sub-embodiment, there is support for allocating multiple non-consecutive 480/960 kHz slot within a 60 kHz slot by indicating a slot interval Z in addition to staring index X and number of slots Y. An example with X=1, Y=3, and Z=2 is illustrated in FIG. 21 where the configuration table is reinterpreted for the case of "Number of PRACH slots within a 60 GHz slot" that is equal to 2. The same approach could also be used to indicate 480/960 kHz slots within 120 kHz slots, with set of 120 kHz slots to used indicated separately as described above.

In one sub-embodiment, the interpretation of the signaled parameters (e.g., signaled by network node 16 and interpreted by wireless device 22) such as X, Y, and/or Z depends on and/or is based at least in part on N. For example, N=1 could mean or indicate that only one 480/960 kHz slot is allocated per 60 kHz slot and that only X is therefore considered in the slot allocation, while N=2 could mean that additional signaled parameters (e.g., Y and/or Z) are considered (or that X is interpreted in a different way, or that no additional parameters are considered). In a variation of the above sub-embodiments, a pre-determined table of 480/960 SCS slot allocations can be specified. Which row of the table is selected can be based on signaling of a separate Slot Configuration Index (SCI). The row selection can also be based on the SCI and the value N, e.g., N=1 or 2 selects either the first or 2nd half of the table, and then the SCI further indicates which row within the first or second half of the table is selected. The table can include multiple columns for different sub-carrier spacings, or separate tables can be configured for different PRACH subcarrier spacings. Each element in the table contains a particular combination of {X,Y} where the two values are either separately listed or listed as one value jointly encoded into a start-length indicator value (SLIV). A non-limiting example for one of a plurality of possible PRACH subcarrier spacings is shown in Table 3. In this example, the table includes SLIV values for the slot configuration.

TABLE 3

Table of example pre-configured PRACH slot allocations within a 60 kHz slot for a particular PRACH subcarrier spacing. The slot allocations are listed as SLIV values.

| Slot Configuration Index | Slot Configuration |
|---|---|
| 0 | SLIV 0 |
| 1 | SLIV 1 |
| 2 | SLIV 2 |
| 3 | SLIV 3 |
| . . . | |
| M − 1 | SLIV M − 1 |

In one sub-embodiment, the set of 480/960 kHz slots within a 60 kHz slot to be allocated to PRACH is indicated with a bit map such as network node 16 where the bit map contains (at least) as many bits as there are 480/960 kHz slots within the 60 kHz slot, each bit indicating whether the slot is allocated to PRACH or not. An example for SCS 480 kHz with the bit map 00111010 is shown in FIG. 22 where the configuration table is reinterpreted where 480 kHz slots are allocated for PRACH in each 60 kHz slot and are signaled using the bit map. Alternatively, the bit map could refer to 480/960 kHz slots within a 120 kHz slot where the 120 kHz slots to be used could be signaled separately or be fixed in the standard (in the same manner as for FR2 in 3GPP Rel-15/16, or in some other manner). To reduce signaling, one could alternatively have a bit map with coarser granularity, e.g., let each bit in the bit map refer to multiple 480/960 kHz slots.

Note that, as discussed above in Example #1-1, it may be useful to spread 480/960 kHz slots to avoid spikes in processing load at, for example, the wireless device 22. The signaling method could be influenced by such considerations, e.g., the possible values of the spacing parameter Z could be restricted so that a maximum of one 480/960 kHz slot within each 120 kHz slot can be allocated to PRACH. This could lead to fewer bits needed for signaling Z. If a bit map is used for signaling, the 3GPP standard could mandate that bit maps are such that the interval between 480/960 kHz slots is large enough or meets a predefined minimum size criterion (in connected mode possibly dependent on wireless device capability). Alternatively, the network node 16 may avoid signaling too densely spaced 480/960 kHz slots based on its implementation, even if the 3GPP standard does not impose any limitations.

In a variation of this embodiment, each element of the PRACH slot configuration table shown in Table 1 can contain a different bitmap.

The above methods and/or embodiments such as X/Y/Z or bit map can also be combined in various ways. For example, instead of having the bits in the bit map refer to consecutive 480/960 kHz slots starting from the beginning of a 120 kHz slot, it could be defined that X determines which 480/960 kHz slot is referred to by the first bit of the bit map, and that the subsequent bits of the bit map refer to 480/960 kHz slots spaced according to Z.

Example #2—Redefine Reference SCS for PRACH Slot (480 Instead of 60 kHz)

In this embodiment, the reference SCS for PRACH is redefined from 60 kHz to a higher SCS, e.g., 480 kHz. The reference SCS is the SCS that is used for the column "slot number" in Table 6.3.3.2-4 in 3GPP TS 38.211. For example, the following text in 3GPP TS 38.211 need to be modified as follows where the modification is illustrated in bold:

| For the purpose of slot numbering in the tables, the following subcarrier spacing shall be assumed: |
|---|
| 15 kHz for FR1 |
| 60 kHz for FR2. |
| 480 kHz for FR2b | where the frequency range above 52.6 GHz has been denoted FR2b (e.g., FR2-2), in this example.

If "Table 6.3.3.2-4: Random access configurations for FR2 and unpaired spectrum" in 3GPP TS 38.211 is used, the slot range is limited to 0-39, which does not cover a full radio frame (10 ms) when the reference SCS is changed to higher that 60 kHz. For example, if 480 kHz is used as reference SCS (8 times larger than 60 kHz), there are 8*40=320 slots within a 10 ms radio frame. Hence, slot range 0-39 may only cover configurations assigning PRACH slots in the first 10/8=1.25 ms of each radio frame. FIG. 23 is a diagram of PRACH slots according to a reinterpretation of the configuration table for the case where the reference SCS is 480 kHz.

As a remedy there are several options, examples of which are discussed below.

Example #2-1

In this embodiment, the slot numbers in the existing 3GPP Rel-15 table are reinterpreted by, for example, wireless device 22, so that slot n (in the table) refers to slot n*B, where B=[2^($\mu$–2)] and $\mu$ is the parameter defining the SCS. That is, for 480 kHz SCS $\mu$=5 and thus B=8. For example, for 480 kHz the slot pattern (3, 5, 7) becomes (3*8, 5*8, 7*8)=(24, 40, 56). In this way, the existing table can be reused, but the slot numbers indicated in the existing 3GPP Rel-15 table are reinterpreted.

Figures 24, 25:
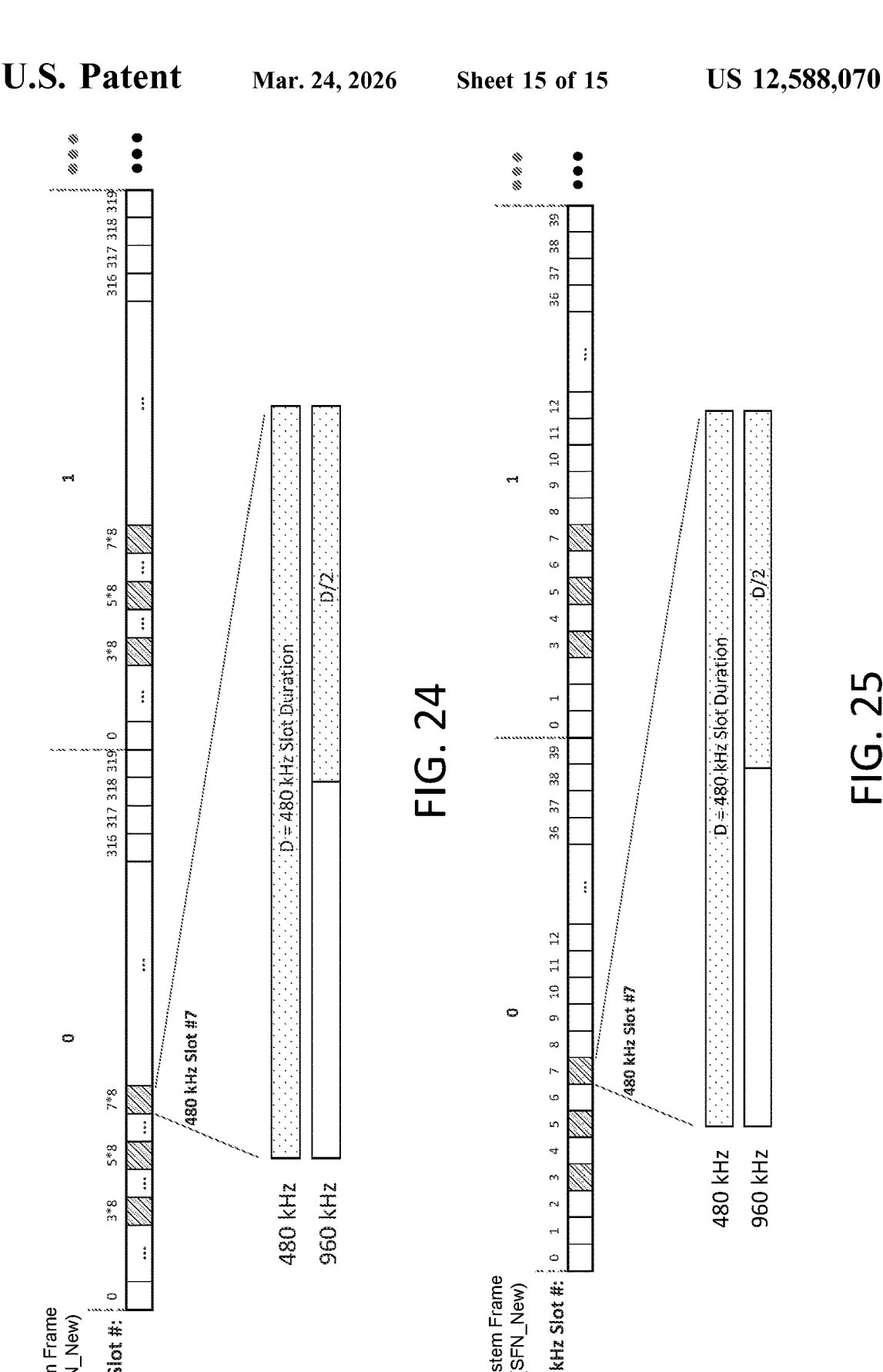
FIG. 24 is a diagram of PRACH slots according to a reinterpretation of the configuration table for the case when the reference SCS is 480 kHz and the slot numbers are scaled with a factor of 8 according to some embodiments of the present disclosure.
FIG. 25 is a diagram of PRACH slots according to another reinterpretation of the configuration table for the case when the reference SCS is 480 kHz and the system frame number is scaled with a factor of 8 according to some embodiments of the present disclosure.

FIG. 24 is a diagram of PRACH slots according to a reinterpretation of the configuration table for the case when the reference SCS is 480 kHz and the slot numbers are scaled within a factor of 8.

In a variant of Example #2-1, an offset (k), where k=0, . . . , B–1, is applied to the scaled slot numbers. The offset values enable configuration of PRACH slots in any slot of the larger SCS. The offset value can, for example, be provided via signaling such as by network node 16. The signaling could, for example, be via RMSI for initial access and RRC for connected mode. For example, for 480 kHz the slot pattern (3, 5, 7) using offset k=5 becomes (3*8+5, 5*8+5, 7*8+5)=(29, 45, 61).

Example #2-2

In this embodiment, the slot numbers are reinterpreted so that slot n (in the table) refers to slot n+k*40 where k=0, . . . , B–1 and B is defined as in Example #2-1.

That is, the slot pattern for slots 0-39 repeats B times throughout the frame. For example, for 480 kHz the slot pattern (3, 5, 7) becomes (3, 5, 7, 43, 45, 47, 83, 85, 87, . . . , 283, 285, 287).

Example #2-3

In this embodiment, the system frame number field is scaled with a factor B (as defined in Example #2-1) SFN_new=SFN/B. That is, for 480 kHz SCS, the new time unit is 10/8 ms=1.25 ms. For example, in existing systems, when the table indicates PRACH slots in system frames fulfilling $n_{SFN}$ mod x=, with x=2 and y=1, that would imply that the pattern repeats every 2*10 ms=20 ms and occurs in odd frame numbers. With the reinterpretation of the table as described herein, the pattern would repeat every 20/8=2.5 ms and occur in the second 1.25 ms part of the 2.5 ms period. With this reinterpretation, the slot numbering from 0-39 is sufficient to cover a full 1.25 ms period. The resulting PRACH slots may be the same as for the reinterpretation in Example #2-2.

FIG. 25 is a diagram of PRACH slots according to a reinterpretation of the configuration table for the case when the reference SCS is 480 kHz and the system frame number is scaled with a factor of 8.

Therefore, in one or more embodiments described herein, the random-access configuration table or tables such as those in 3GPP TS 38.211 related to PRACH configurations may be reinterpreted, or interpreted in different ways, when adding support for higher SCS (e.g., 480 and 960 kHz) for PRACH.

Some Examples

Example A1. A network node 16 configured to communicate with a wireless device 22 (WD 22), the network node 16 configured to, and/or comprising a radio interface 62 and/or comprising processing circuitry 68 configured to:

configure a physical random access channel, PRACH, configuration to support a subcarrier spacing, SCS, of at least 480 kHz; and signal the PRACH configuration to the wireless device for implementation.

Example A2. The network node 16 of Example A1, wherein the configured PRACH configuration is based on a reinterpretation of a configuration table that defines a plurality of predefined random access configurations associated with one of a 60 kHz SCS and 120 kHz SCS.

Example A3. The network node 16 of any one of Examples A1-A2, wherein the reinterpretation includes retaining a reference SCS of 60 kHz for a slot pattern and modifying at least one rule for which slots within a 60 kHz slot are allocated for PRACH.

Example A4. The network node 16 of any one of Examples A1-A2, wherein the reinterpretation includes redefining a reference SCS of 60 kHz for a slot pattern of at least 480 kHz.

Example B1. A method implemented in a network node 16, the method comprising:

configuring a physical random access channel, PRACH, configuration to support a subcarrier spacing, SCS, of at least 480 kHz; and signaling the PRACH configuration to the wireless device for implementation.

Example B2. The method of Example B1, wherein the configured PRACH configuration is based on a reinterpretation of a configuration table that defines a plurality of predefined random access configurations associated with one of a 60 kHz SCS and 120 kHz SCS.

Example B3. The method of any one of Examples B1-B2, wherein the reinterpretation includes retaining a reference SCS of 60 kHz for a slot pattern and modifying at least one rule for which slots within a 60 kHz slot are allocated for PRACH.

Example B4. The method of any one of Examples B1-B2, wherein the reinterpretation includes redefining a reference SCS of 60 kHz for a slot pattern of at least 480 kHz.

Example C1. A wireless device 22 (WD 22) configured to communicate with a network node 16, the WD 22 configured to, and/or comprising a radio interface 82 and/or processing circuitry 84 configured to:

receive a physical random access channel, PRACH, configuration to support a subcarrier spacing, SCS, of at least 480 kHz; and implement the PRACH configuration.

Example C2. The WD 22 of Example C1, wherein the PRACH configuration is based on a reinterpretation of a configuration table that defines a plurality of predefined random access configurations associated with one of a 60 kHz SCS and 120 kHz SCS.

Example C3. The WD 22 of any one of Examples C1-C2, wherein the reinterpretation includes retaining a reference SCS of 60 kHz for a slot pattern and modifying at least one rule for which slots within a 60 kHz slot are allocated for PRACH.

Example C4. The WD 22 of any one of Examples C1-C2, wherein the reinterpretation includes redefining a reference SCS of 60 kHz for a slot pattern of at least 480 kHz.

Example D1. A method implemented in a wireless device 22 (WD 22), the method comprising:

receiving a physical random access channel, PRACH, configuration to support a subcarrier spacing, SCS, of at least 480 kHz; and implementing the PRACH configuration.

Example D2. The method of Example D1, wherein the PRACH configuration is based on a reinterpretation of a configuration table that defines a plurality of predefined random access configurations associated with one of a 60 kHz SCS and 120 kHz SCS.

Example D3. The method of any one of Examples D1-D2, wherein the reinterpretation includes retaining a reference SCS of 60 kHz for a slot pattern and modifying at least one rule for which slots within a 60 kHz slot are allocated for PRACH.

Example D4. The method of any one of Examples D1-D2, wherein the reinterpretation includes redefining a reference SCS of 60 kHz for a slot pattern of at least 480 kHz.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

AP Access point
Cat2/Cat4 (LBT) category 2/4
CCA Clear channel assessment
COT Channel occupancy time
CW Contention window
DL Downlink
FR1 Frequency range 1
gNB Base station (next generation node B)
LAA License assisted access
LBT Listen before talk
LTE Long-term evolution
OFDM Orthogonal frequency division multiplexing
PBCH Physical broadcast channel
PDCCH Physical downlink control channel
PDSCH Physical downlink shared channel
PRACH Physical Random Access Channel
PRB Physical resource block
PSD Power spectral density
PSS Primary synchronization signal
PUCCH Physical uplink control channel
PUSCH Physical Uplink Shared Channel
RACH Random Access Channel
RRC Radio resource control
Rx Reception/receive
SCS Subcarrier spacing
SFN System frame number
SIB1 System information block 1
SS Synchronization signal
SSB SS block SSS Secondary synchronization signal STA Station (WiFi [user] node)

TxOP Transmission opportunity

TDD Time division duplex

Tx Transmission/transmit

UL Uplink

URLLC Ultra-reliable and low latency communication

UE User equipment

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented by a wireless device for physical random access channel, PRACH, signaling, the method comprising:

obtaining an integer number, N, from a field in a table which indicates a number of at least one slot to be selected from a plurality of slots corresponding to a first subcarrier spacing, SCS;

selecting at least one slot from the plurality of slots corresponding to the first SCS greater than 120 kHz, each of the at least one slot including at least one physical random access channel, PRACH, occasion, the plurality of slots having a time duration equivalent to a time duration of a single slot corresponding to a second SCS lower than the first SCS, and:

when the field in the table indicates N=1, the selecting at least one slot from the plurality of slots corresponding to the first SCS comprises selecting a last slot from the plurality of slots; and the plurality of slots are numbered starting from 0 in ascending order; when a total number of slots of the plurality of slots corresponding to the first SCS is 8, the selected slot is slot number 7; when the total number of slots of the plurality of slots corresponding to the first SCS is 16, the selected slot is slot number 15; and transmitting the PRACH signaling within the at least one PRACH occasion in the at least one selected slot.

2. The method of claim 1, wherein the first SCS is an integer multiple of the second SCS, and the total number of slots of the plurality of slots equals to the integer.

3. The method of claim 1, when the field in the table indicates N>1, the selecting at least one slot from the plurality of slots corresponding to the first SCS comprises: selecting N slots that are separated in time.

4. The method of claim 1, when the field in the table indicates N=2 and the plurality of slots corresponding to the first SCS is numbered from 0 in ascending order:

when the total number of slots of the plurality of slots corresponding to the first SCS is 8, the selected slots are slot numbers 3 and 7; and when the total number of slots of the plurality of slots corresponding to the first SCS is 16, the selected slots are slot numbers 7 and 15.

5. The method of claim 4, when the total number of slots of the plurality of slots corresponding to the first SCS is 8, the first SCS is 480 kHz and the second SCS is 60 kHz; when the total number of slots of the plurality of slots corresponding to the first SCS is 16, the first SCS is 960 kHz and the second SCS is 60 kHz.

6. The method of claim 1, when the total number of slots of the plurality of slots corresponding to the first SCS is 8, the first SCS is 480 kHz and the second SCS is 60 kHz; when the total number of slots of the plurality of slots corresponding to the first SCS is 16, the first SCS is 960 kHz and the second SCS is 60 kHz.

7. The method of claim 1, wherein the table is a random access configuration table and the PRACH signaling is a preamble signal for random access, the table further comprising:

the field indicating the number of the at least one PRACH occasions within the at least one slot to be selected.

8. A wireless device comprising:

processing circuitry configured to:

obtain an integer number, N, from a field in a table which indicates a number of at least one slot to be selected from a plurality of slots corresponding to a first subcarrier spacing, SCS;

select at least one slot from the plurality of slots corresponding to the first SCS greater than 120 kHz, each of the at least one slot including at least one physical random access channel, PRACH, occasion, the plurality of slots having a time duration equivalent to a time duration of a single slot corresponding to a second SCS lower than the first SCS, and:

when the field in the table indicates N=1, the selecting at least one slot from the plurality of slots corresponding to the first SCS comprises selecting a last slot from the plurality of slots; and the plurality of slots are numbered starting from 0 in ascending order; when a total number of slots of the plurality of slots corresponding to the first SCS is 8, the selected slot is slot number 7; when the total number of slots of the plurality of slots corresponding to the first SCS is 16, the selected slot is slot number 15; and cause transmission of PRACH signaling within the at least one PRACH occasion in the at least one selected slot.

9. The wireless device of claim 8, wherein the first SCS is an integer multiple of the second SCS, and the total number of slots of the plurality of slots equals to the integer.

10. A method implemented by a network node, the method comprising:

receiving physical random access channel, PRACH, signaling within at least one PRACH occasion in a PRACH slot, the PRACH slot being one of a plurality of slots corresponding to a first subcarrier spacing, SCS, greater than 120 kHz, and the plurality of slots corresponding to the first SCS having a time duration equivalent to a time duration of a single slot corresponding to a second SCS lower than the first SCS;

performing at least one action based at least on the PRACH signaling; and the PRACH signaling being based on an integer number, N, from a field in a table which indicates a number of at least one slot to be selected from the plurality of slots corresponding to the first SCS, and:

when the field in the table indicates N=1, the selection of at least one slot from the plurality of slots corresponding to the first SCS comprises a selection of a last slot from the plurality of slots; and the plurality of slots are numbered starting from 0 in ascending order; when a total number of slots of the plurality of slots corresponding to the first SCS is 8, the selected slot is slot number 7; when the total number of slots of the plurality of slots corresponding to the first SCS is 16, the selected slot is slot number 15.

11. The method of claim 10, wherein the first SCS is an integer multiple of the second SCS, the total number of slots of the plurality of slots equals to the integer, and the second SCS is 60 kHz.

12. The method of claim 11, wherein when the receiving PRACH signaling is within one PRACH slot of the plurality of slots, the PRACH slot is a last slot of the plurality of slots when the integer is 8 or 16; when the receiving PRACH signaling is within two PRACH slots of the plurality of slots, the two PRACH slots are a fourth and a last slots when the integer is 8, or an eighth and a last slots when the integer is 16.

13. A network node comprising:

processing circuitry configured to:

receive physical random access channel, PRACH, signaling within at least one PRACH occasion in a PRACH slot, wherein the PRACH slot is one of a plurality of slots corresponding to a first subcarrier spacing, SCS, greater than 120 kHz, and the plurality of slots corresponding to the first SCS has a time duration equivalent to a time duration of a single slot corresponding to a second SCS lower than the first SCS;

perform at least one action based at least on the PRACH signaling; and the PRACH signaling being based on an integer number, N, from a field in a table which indicates a number of at least one slot to be selected from the plurality of slots corresponding to the first SCS, and:

when the field in the table indicates N=1, the selection of at least one slot from the plurality of slots corresponding to the first SCS comprises a selection of a last slot from the plurality of slots; and the plurality of slots are numbered starting from 0 in ascending order; when a total number of slots of the plurality of slots corresponding to the first SCS is 8, the selected slot is slot number 7; when the total number of slots of the plurality of slots corresponding to the first SCS is 16, the selected slot is slot number 15.

14. The network node of claim 13, wherein the first SCS is an integer multiple of the second SCS, the total number of slots of the plurality of slots equals to the integer, and the second SCS is 60 kHz.

*  *  *  *  *